United States Patent [19]
Perkins

[11] Patent Number: 6,137,675
[45] Date of Patent: Oct. 24, 2000

[54] SUPPORTIVE BELT SYSTEM INTEGRATING COMPUTERS, INTERFACES, AND OTHER DEVICES

[76] Inventor: Michael T. Perkins, 902 McPhaul St., Austin, Tex. 78758

[21] Appl. No.: 09/060,658

[22] Filed: Apr. 15, 1998

Related U.S. Application Data

[60] Provisional application No. 60/065,562, Nov. 14, 1997, and provisional application No. 60/043,320, Apr. 15, 1997.

[51] Int. Cl.[7] .................................................. A61F 5/00
[52] U.S. Cl. ..................... 361/679; 361/680; 361/724; 361/727; 2/338; 224/617; 128/876
[58] Field of Search ................................. 361/724–727, 361/683, 679, 680; 2/338; 128/876; 224/904, 617; 364/708.1

[56] References Cited

U.S. PATENT DOCUMENTS

| | | | |
|---|---|---|---|
| 4,745,911 | 5/1988 | Bender | 128/78 |
| 5,105,806 | 4/1992 | Woodhouse et al. | 128/961 |
| 5,226,195 | 7/1993 | Pappas, Jr. | 2/338 |
| 5,228,609 | 7/1993 | Gregory | 224/224 |
| 5,242,056 | 9/1993 | Zia et al. | 206/576 |
| 5,285,398 | 2/1994 | Janik | 364/708.1 |
| 5,305,181 | 4/1994 | Schultz | 361/680 |
| 5,305,244 | 4/1994 | Newman et al. | 364/708.1 |
| 5,337,935 | 8/1994 | Chambonnet | 224/224 |
| 5,351,340 | 10/1994 | Aldridge | 2/108 |
| 5,363,863 | 11/1994 | Lelli et al. | 128/876 |
| 5,410,762 | 5/1995 | Maskovich | 2/338 |
| 5,416,310 | 5/1995 | Little | 235/462 |
| 5,421,499 | 6/1995 | Bauer | 224/270 |
| 5,450,596 | 9/1995 | Felsenstein | 395/800 |
| 5,468,229 | 11/1995 | Chandler | 604/179 |
| 5,514,861 | 5/1996 | Swartz et al. | 235/473 |
| 5,548,843 | 8/1996 | Chase et al. | 2/102 |
| 5,555,490 | 9/1996 | Carroll | 361/683 |

FOREIGN PATENT DOCUMENTS

WO 9521408 10/1995 WIPO.

OTHER PUBLICATIONS

Asim Smailagic et al: "The CMU Mobile Computers: A New Generation of Computer Systems" pp. 467–473, XP000479421 see Figure 2C; tables 2–4 published Feb. 28, 1994.

*Primary Examiner*—Leo P. Picard
*Assistant Examiner*—Hung Van Duong
*Attorney, Agent, or Firm*—Marshall, O'Toole, Gerstein, Murray & Borun

[57] ABSTRACT

A supportive belt for supporting devices such as computer components around a user's torso, including a vertically rigid rear plate, vertically rigid side and front pod elements, and a front buckle fastener. Hinged pod elements in the belt provide horizontal flexibility and associated springs enable the belt to be self-tensioning. A cantilevered arm is supported on a pod element with movement in four directions for supporting input/output devices, platforms, sensors, readers, etc. Keyboard units are cantilever supported on a pod element. The belt and computer components may be used on a torso, on a workstation platform, etc. and may be readily folded for transport. Passageways in the pod elements enable air to flow through the pod elements and remove heat from the torso.

25 Claims, 21 Drawing Sheets

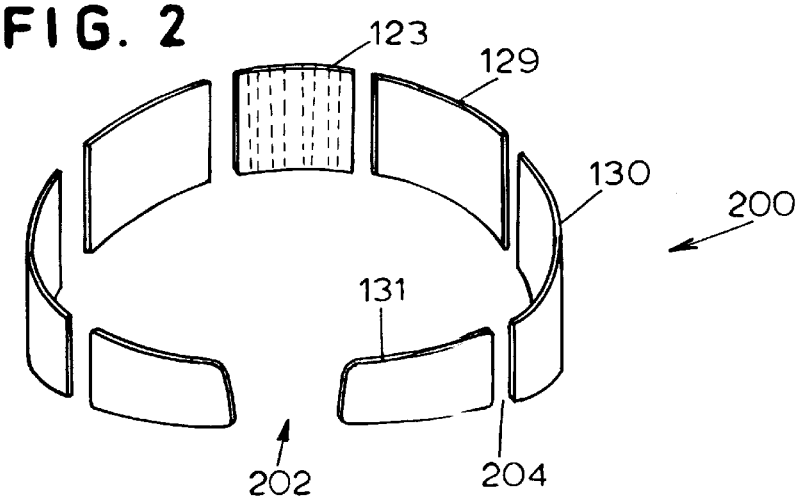
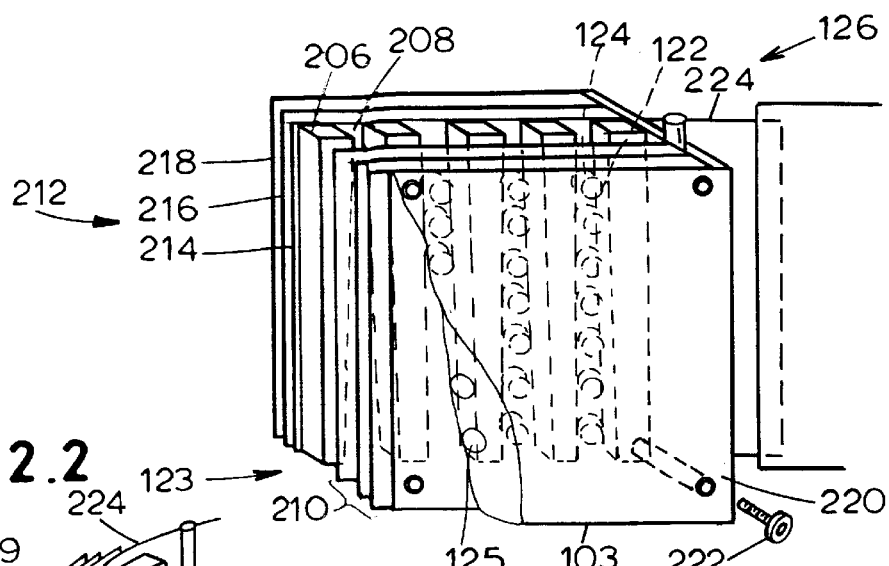
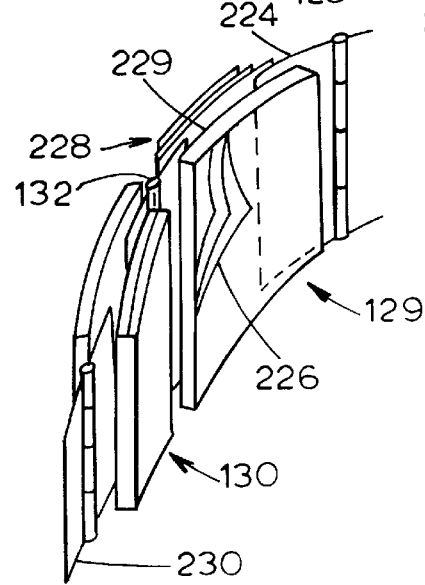
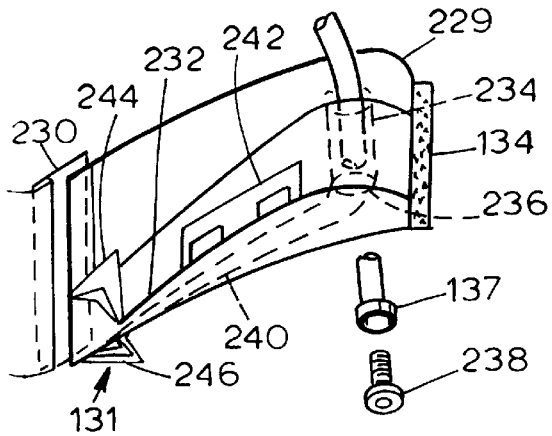

FIG. 3
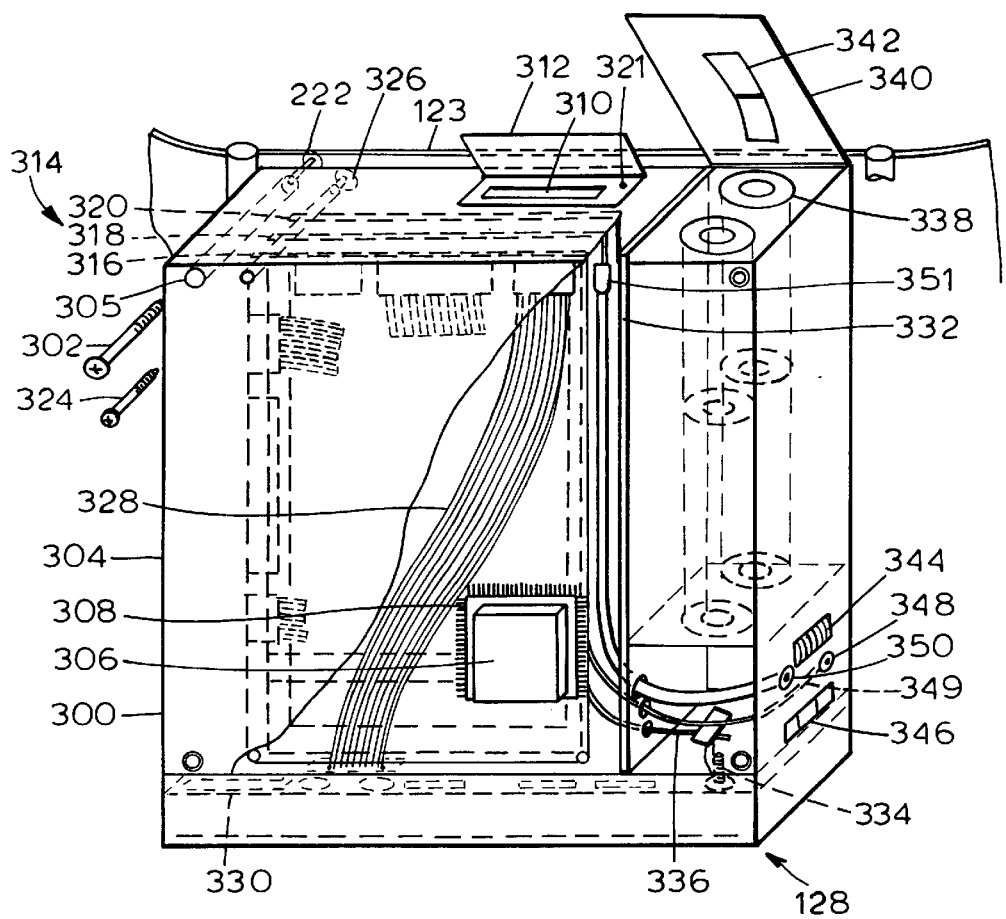
FIG. 3.1
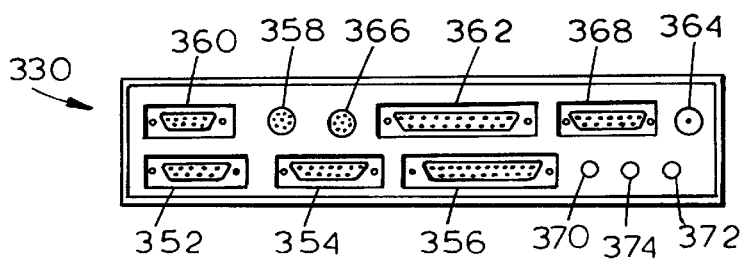
FIG. 3.2
FIG. 3.3
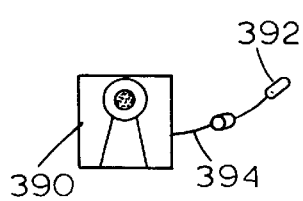

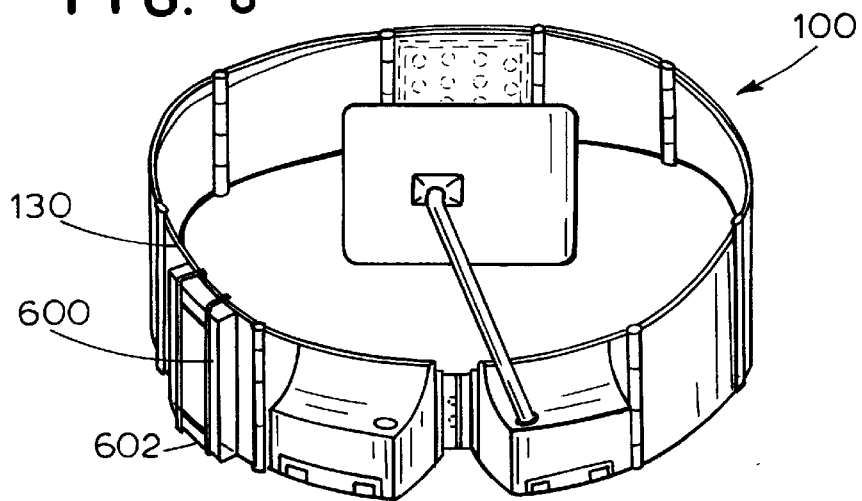
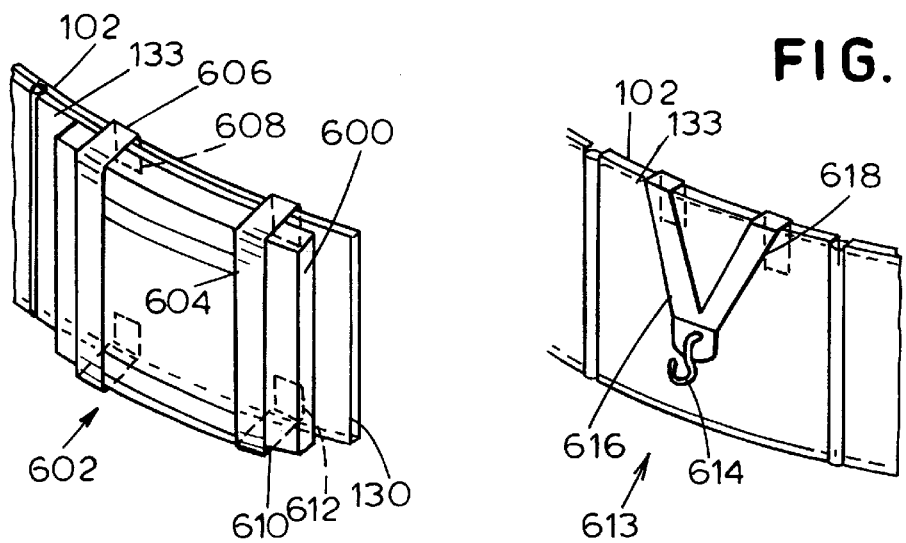
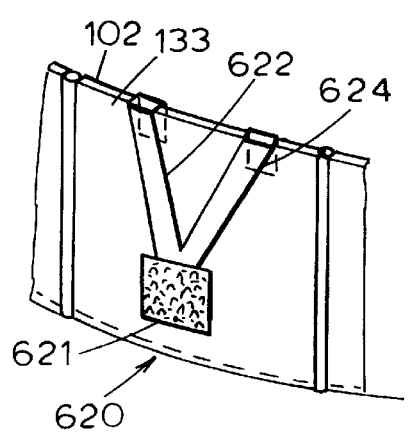

FIG. 7
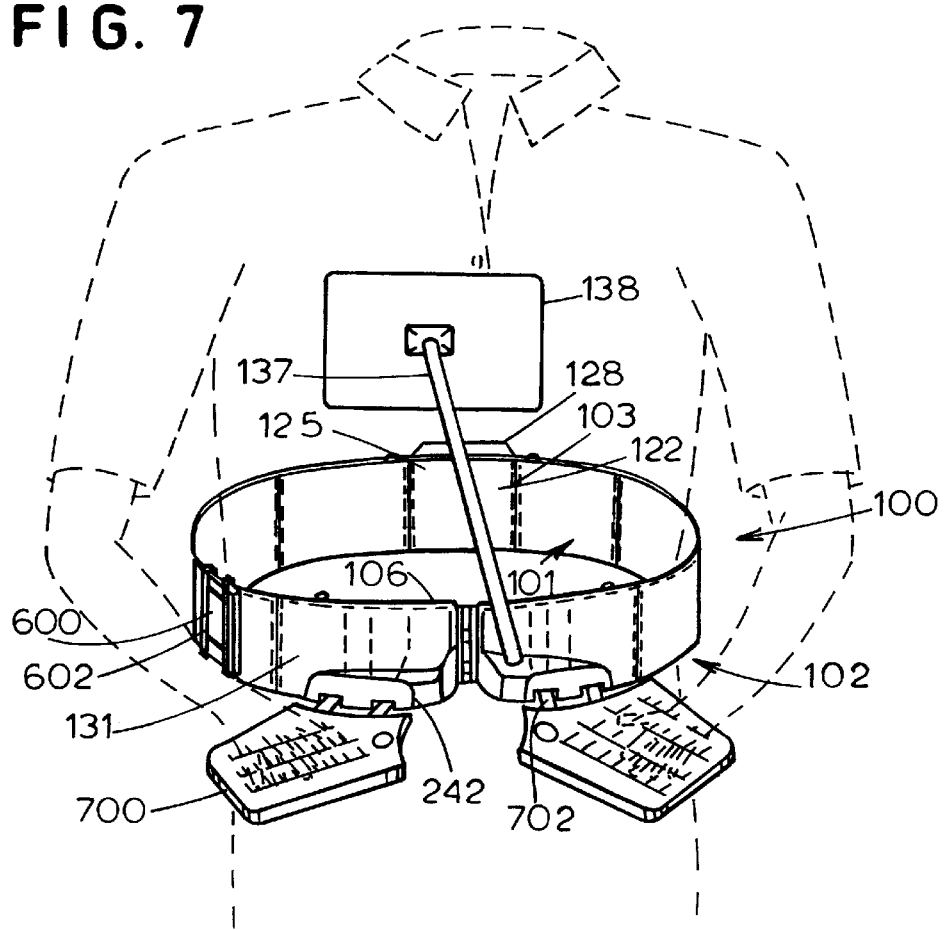
FIG. 7.1
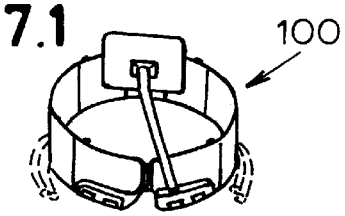
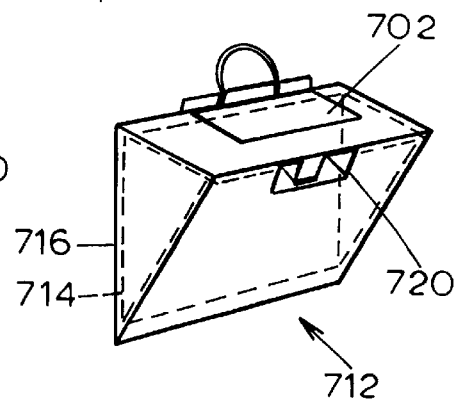
FIG. 7.3
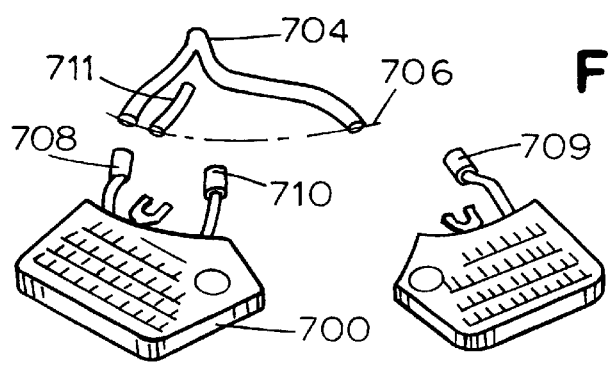

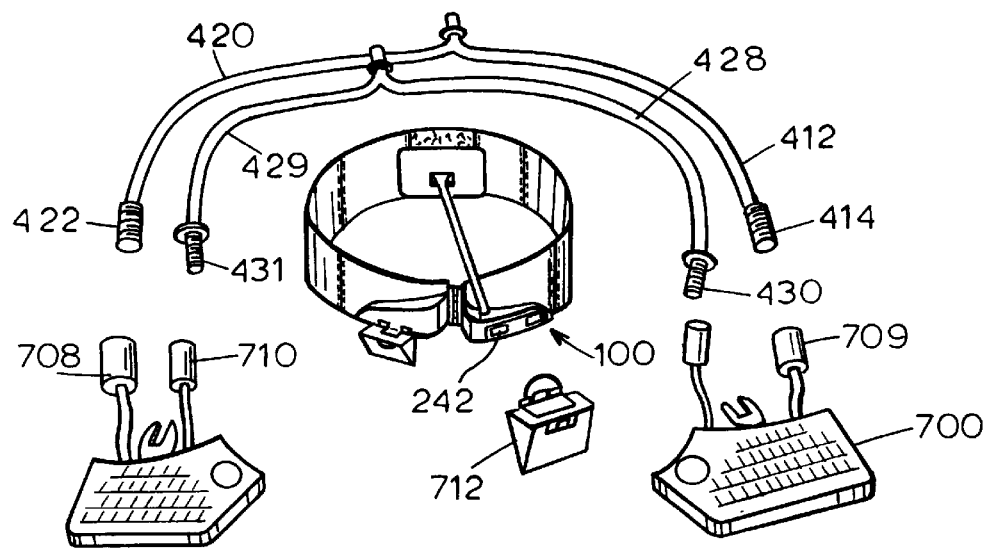
FIG. 7.2
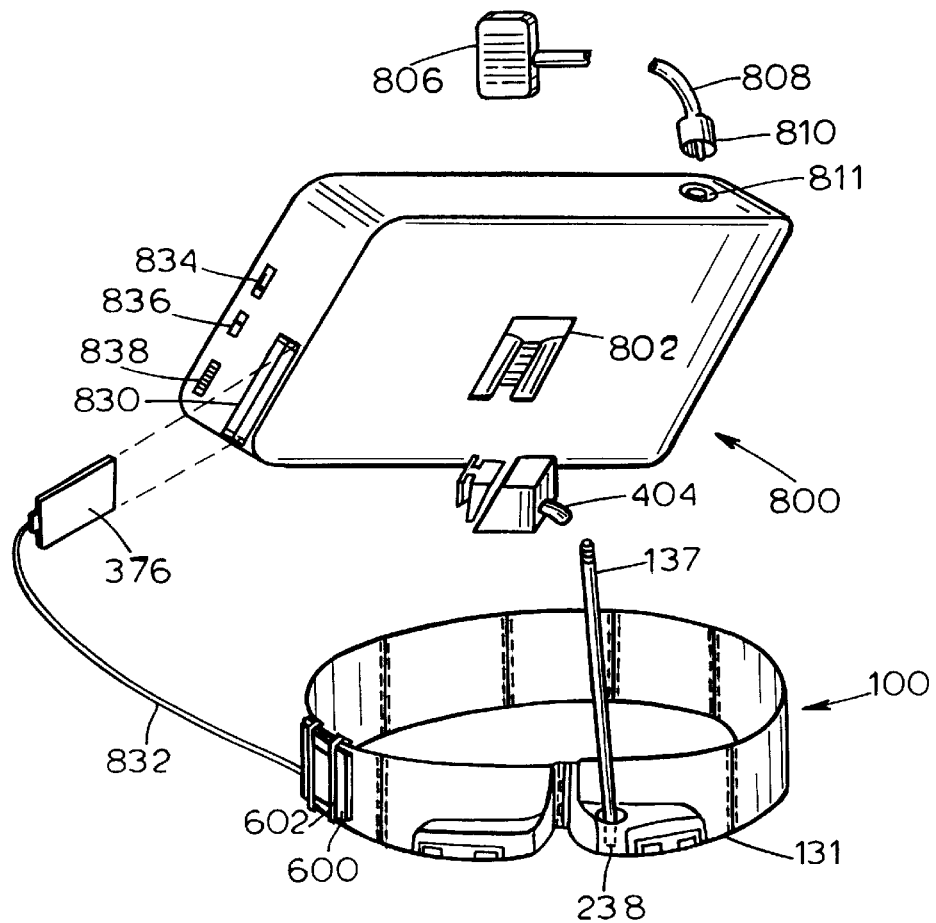
FIG. 8

FIG. 8.1
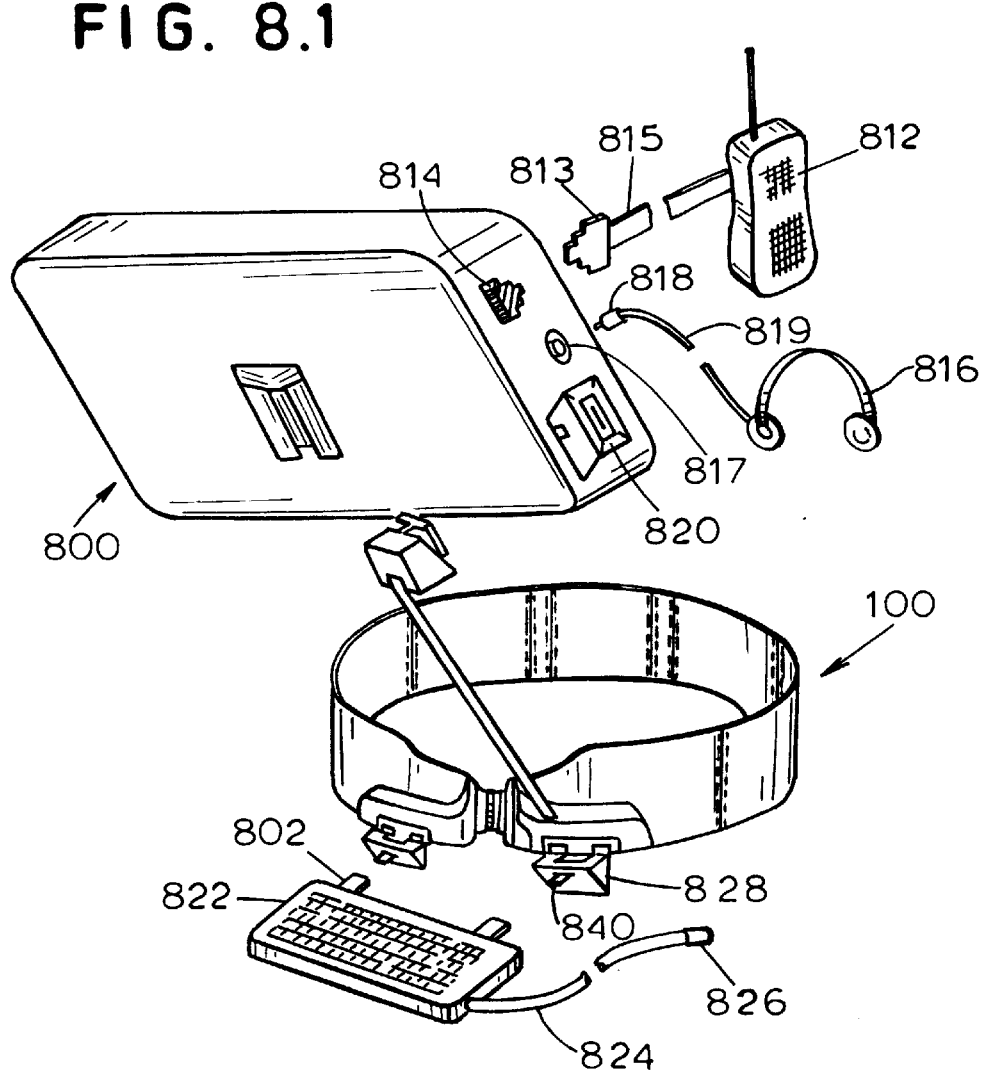
FIG. 9
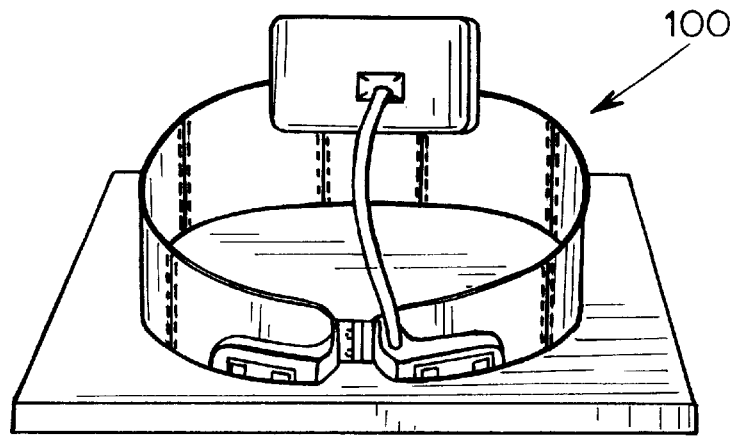

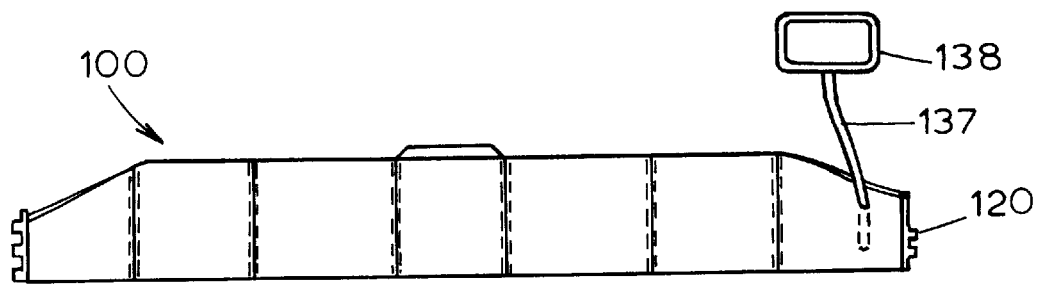
FIG. 9.1
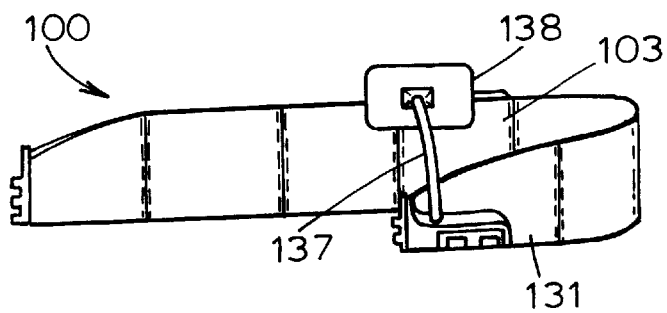
FIG. 9.2
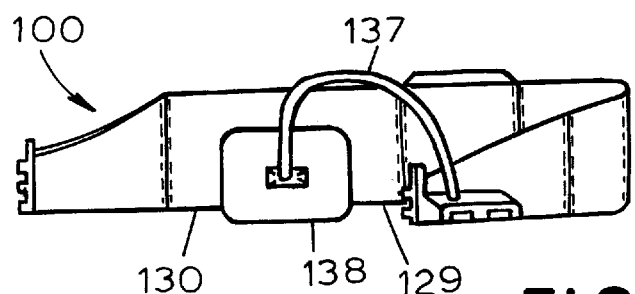
FIG. 9.3
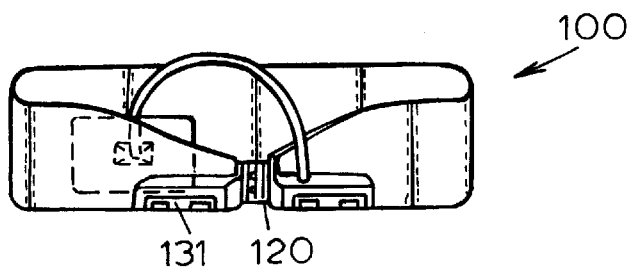
FIG. 9.4

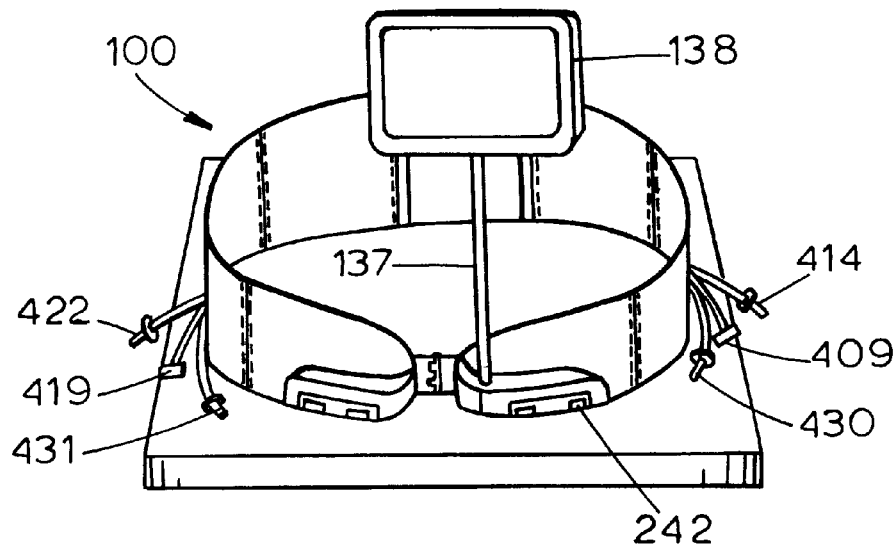
FIG. 9.5
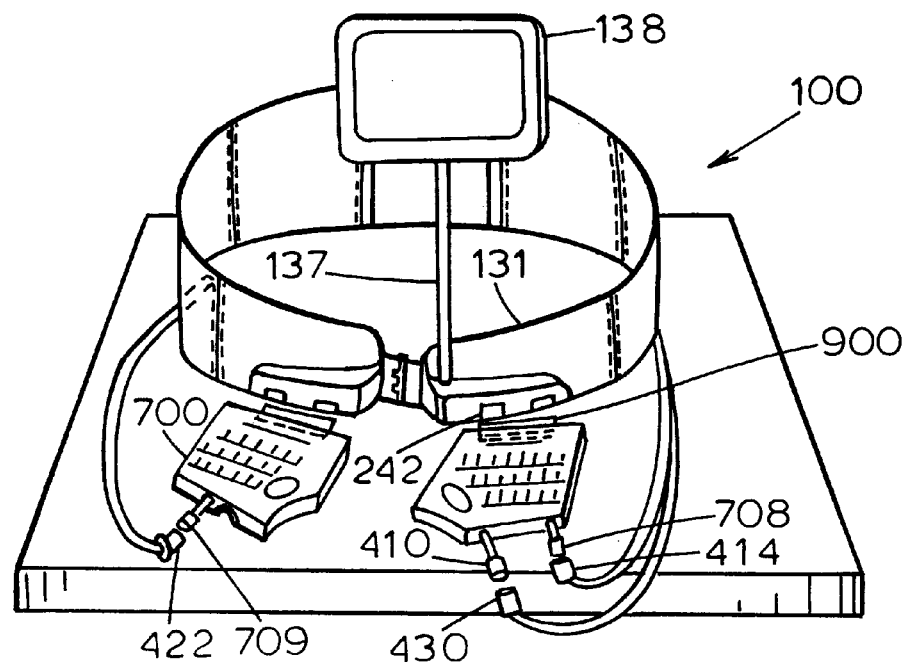
FIG. 9.6

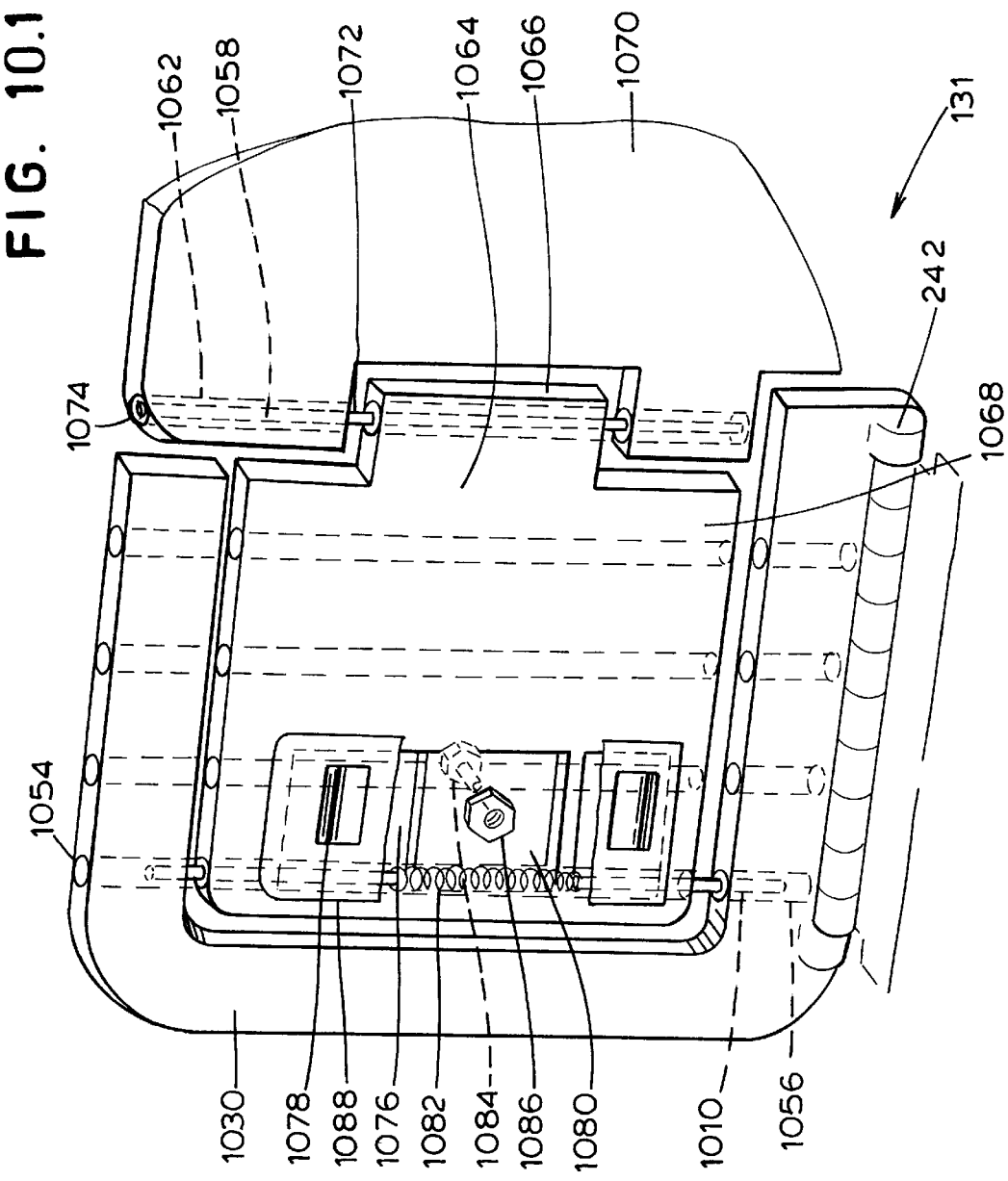

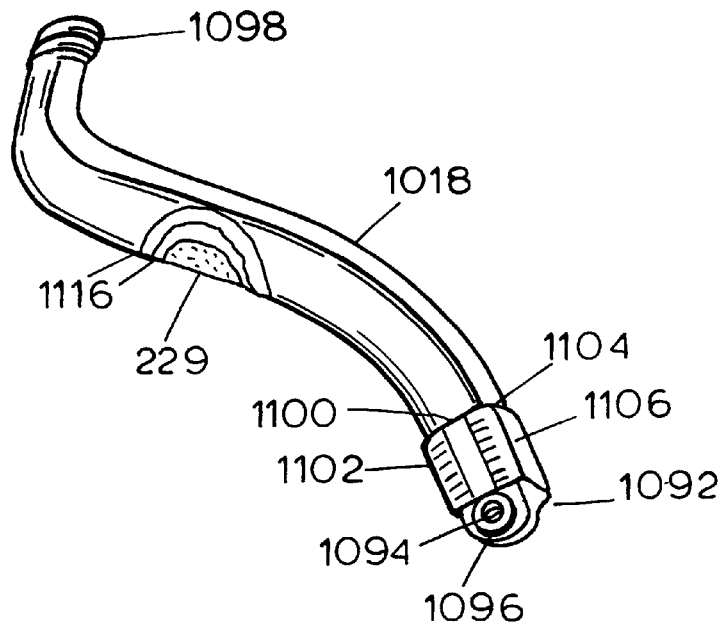
FIG. 10.2
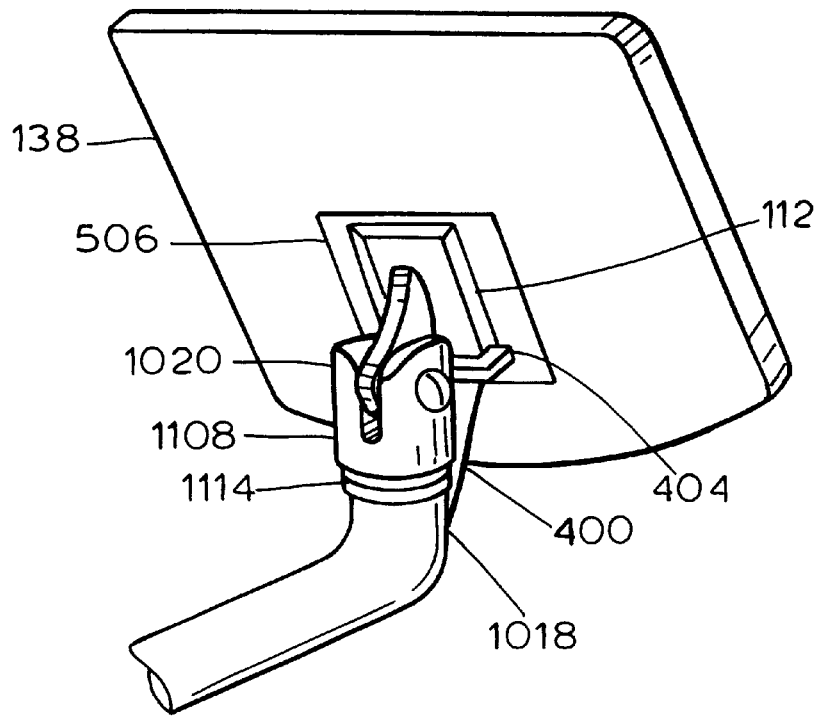
FIG. 10.3a

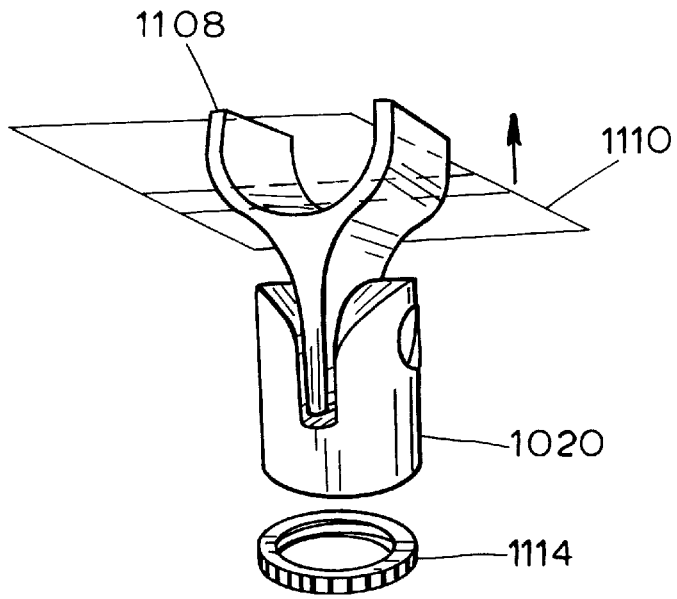
FIG. 10.3b
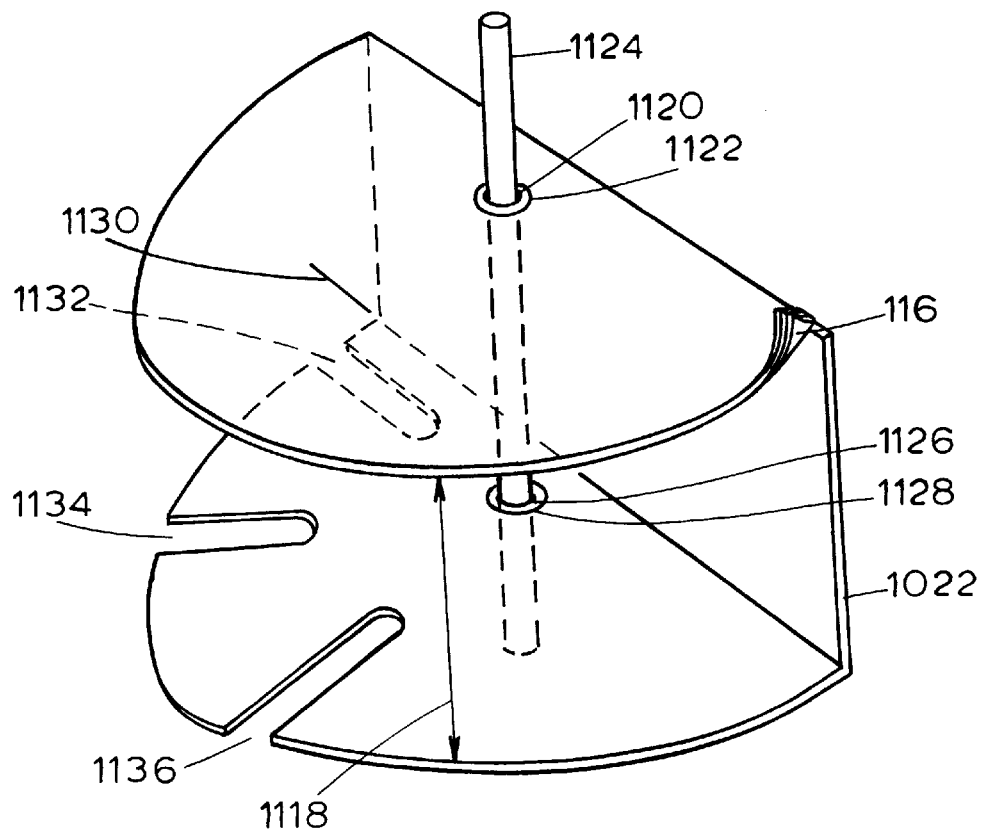
FIG. 10.4

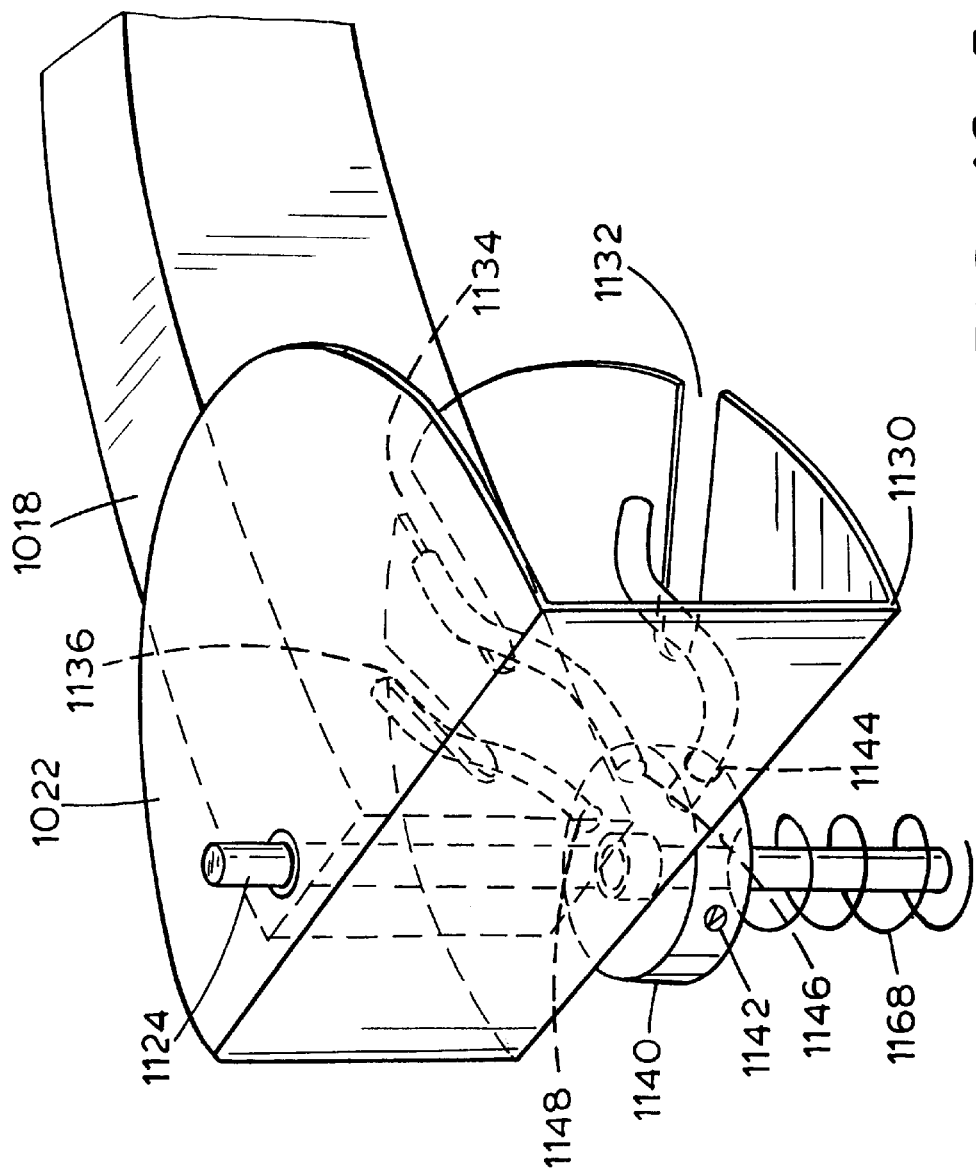
FIG. 10.5

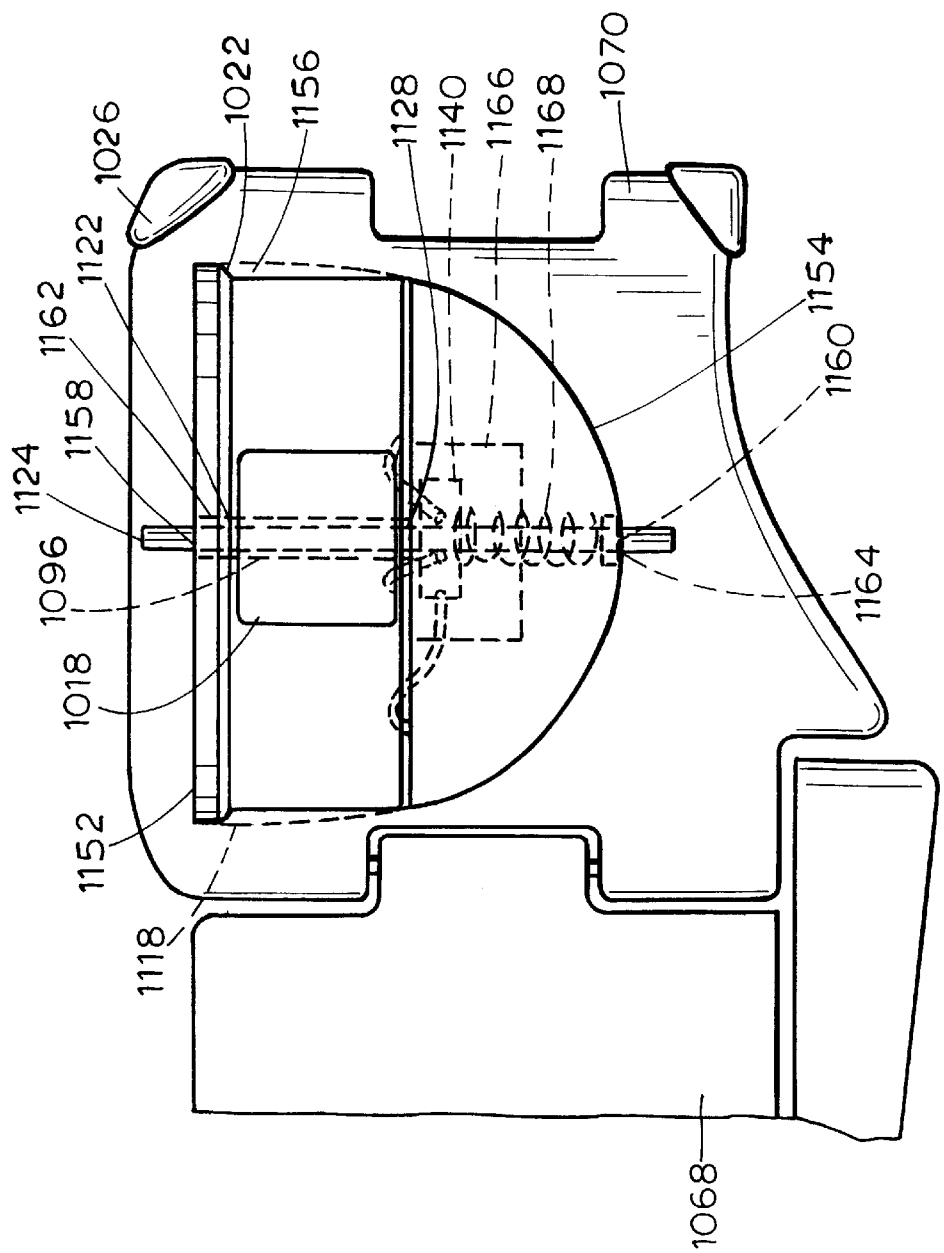
FIG. 10.6

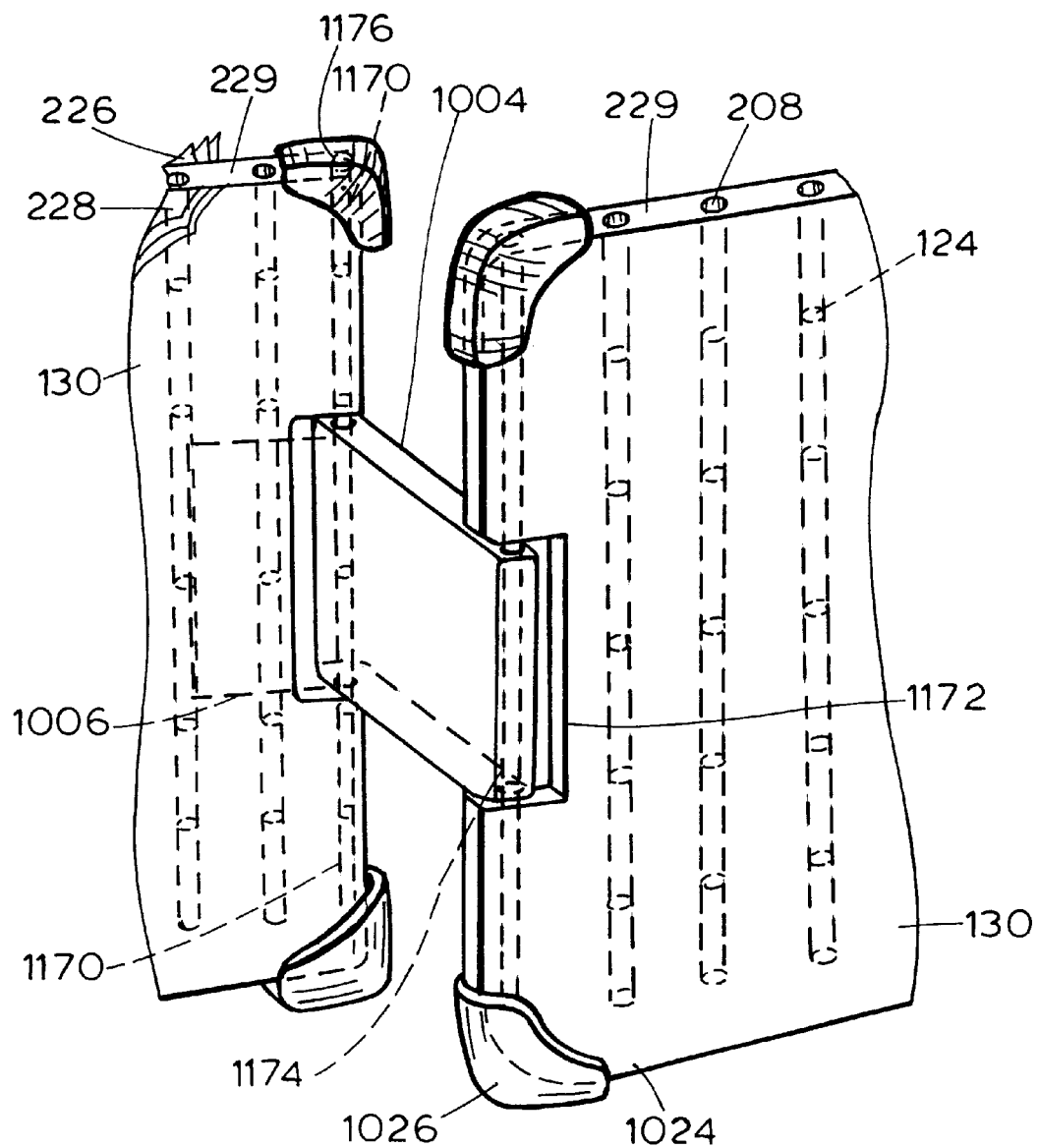
FIG. 10.7

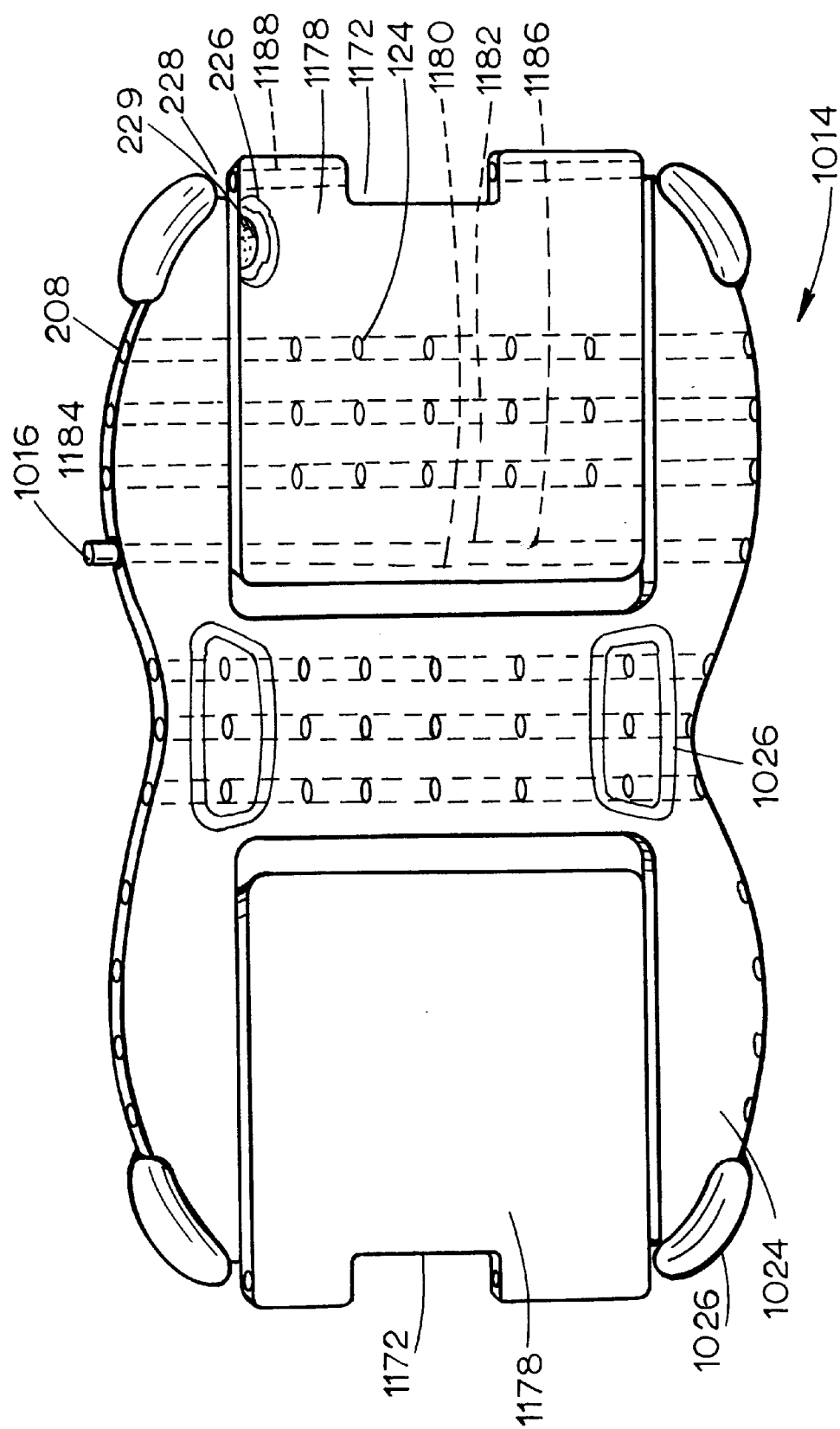
FIG. 10.8

SUPPORTIVE BELT SYSTEM INTEGRATING COMPUTERS, INTERFACES, AND OTHER DEVICES

This application is based on provisional applications Ser. No. 60/065,562 filed Nov. 14, 1997 and Ser. No. 60/043,320 filed Apr. 15, 1997.

FIELD OF INVENTION

The present invention relates generally to a package/article carrier and more specifically to a belt system to be worn by a person (or similar entity) for supporting a computer system/electronics equipment etc.

BACKGROUND OF THE INVENTION

Torso encircling devices and related devices described in existing art which claim to enable a person to use a computer while walking or while engaged in other mobile activities fail to provide either single or integrated solutions for the need for support, comfort, and, most importantly functionality.

Reference may be made to the following patents of interest: U.S. Pat. Nos. 5,226,195; 5,228,609; 5,242,056; 5,285,398; 5,305,181; 5,337,935; 5,351,340; 5,363,863; 5,410,762; 5,416,310; 5,421,499; 5,450,596; 5,514,861; 5,548,843; 5,555,490.

A careful review of these patents of interest reveals a pervasive failure to implement a device which: effectively permits a wearer to use, in a stationary or non-stationary mode, a computing system that permits simultaneous information interface, data entry, sensing, receiving, transmitting and processing; supports those devices to permit their efficient use; provides lumbar support, and airflow in the lumbar region and throughout the structure to permit long-term use; and permits stand alone applications.

Attempts to create person based displays have utilized hand held or stationary LCD panels or Head Mounted Displays or Eye pieces (MIT web page). To date the only support for an LCD came from a hand, knee, or a stand. The use of a stand severely impedes mobility. Head mounted devices and eye pieces are difficult for a wearer to adapt to, distract from human communication and are potentially dangerous because they block all or part of one or both eyes. Although some devices claim that the user must merely make a focal adjustment, this still represents an unnecessary safety compromise especially in an industrial environment.

All previous torso mounted and related devices suffer one or more of the following disadvantages which limit the devices' applications, functionality, comfort, and/or safety:

(a) non-existent, limited, or difficult to use support for packages, articles, or devices;

(b) incomplete distribution of loads or piecemeal support structures;

(c) absence of lumbar support;

(d) lumbar support blocks airflow in the lumbar region, and the device blocks airflow throughout the structure;

(e) belt devices that provide support make adjustment difficult after installation;

(f) belt devices that provide article support restrict the wearer's ability to walk or sit;

(g) interface devices restrict the wearer's vision or compromise the wearer's ability to perform tasks;

(h) interface devices compromise the positioning and mobility of the operator;

(i) vision restricting glasses, ill fitting belts, or protruding table devices compromise safety;

(j) obtrusive head gear and "brick" type devices limit user acceptance;

(k) support devices that implement adjustable interface devices are not mobile;

(l) integrated, bulky physical size of "brick" type devices increase drop frequencies and decreasing reliability;

(m) custom physical implementation of electronics increases cost of maintenance and upgrade; and (n) wearables lack flexibility that allows reconfiguring for multiple operation styles.

It is therefore desired to provide an improved torso mounted device which can solve the problems of such proposed prior devices.

SUMMARY OF THE INVENTION

In accordance with the present invention, a supportive belt system comprises an unrestricted (mobile without head gear or lenses) information interface platform that offers sensing, receiving, transmitting, processing, display and information entry. The belt improves support efficiency for operation of devices while the user works minimizing physical risks to the wearer, and maximizing wearer comfort.

A supportive belt system which effectively permits a wearer to use, in a stationary or non-stationary mode, an integrated computing system that permits simultaneous information interface, data entry, sensing, receiving, transmitting and processing; supports those computing system devices to permit their efficient use; provides lumbar support and airflow to remove heat in the lumbar region and throughout the device to permit long-term use; and permits stand alone applications. The belt system comprises an unrestricted (mobile without head gear or lenses) information interface platform that offers sensing, receiving, transmitting, processing, display and information entry. The belt improves support efficiency for operation of integrated computing system devices while the user works minimizing physical risks to the wearer, and maximizing wearer comfort.

In a preferred embodiment my supportive belt reduces the number of belt components; enables a larger choice of belt material to be used; improved structural integrity of the supportive belt to provide vertical rigidity and horizontal flexibility for more reliable and functional operations; enables size adjustments; provides better cushioning during user wear; and provides "break away" safety for the supported computer components.

Accordingly, in addition to the specific advantages of my belt described herein, several further advantages of the present invention are:

(a) provide a vertically rigid torso conforming support device for packages, articles and equipment that does not suffer from existing art's intrusive requirement of committing a wearer's hands or head to support a display;

(b) distribute packages, articles, or devices (loads) evenly around the torso to maximize support efficiency;

(c) provide adjustable lumbar support to increase efficiency;

(d) provide for airflow through the length of the device, and through the lumbar support mechanism to reduce the effects of wearing a device and carrying loads on the torso;

(e) provide quick release convenience;

(f) provide a stable platform for input/output interface;

(g) provide an innovative, solution to the problem of unencumbered computing while the wearer stands, sits, or walks;

(h) provide ergonomically correct positioning of devices for the wearer's interface requirements;

(i) provide a fail-safe safety design for key pad and peripheral devices to protect the person (wearer and others) and the belt;

(j) provide a ergonomically engineered device that will result in efficiency increases over prior performance and lead to increased user acceptance;

(k) provide an adjustable display and input/output assembly that enables viewing from multiple positions and angles;

(l) provide a wearable device featuring lightness, strength, durability and ruggedness;

(m) provide a device using commercial standards and modularity to lower maintenance and upgrade costs; and (n) allow morphing of the device to various configurations that permits use on the person or use as a stand alone work station, and allows for easy transportation and storage.

BRIEF DESCRIPTION OF THE DRAWINGS

FIGS. 2 to 2.3 show the physical structure of my supportive belt.

FIGS. 3 to 3.3 show details of a processor housing for my belt.

FIGS. 6 to 6.3 are perspective views showing belt mounting devices for mounting peripheral devices with my belt.

FIGS. 7 to 7.3 are perspective views of my supportive belt mounted on a torso and with keypad details of assembly.

FIGS. 8 to 8.1 are perspective views of a Personal Digital Assistant embodiment with attachments for my belt.

FIGS. 9 to 9.6 are several views showing basic morphologies of my belt.

FIG. 10.1 is a fragmented front view showing a preferred embodiment of the front buckle with size adjustments for my belt system.

FIG. 10.2 is a perspective view showing an alternative embodiment of a cantilevered arm for supporting display devices, etc. on my belt system.

FIGS. 10.3(a)–10.3(b) are perspective views showing an alternative embodiment of a mounting flange at the cantilevered arm support end for my belt system.

FIGS. 10.4 and 10.5 are perspective views and FIG. 10.6 is a fragmented front view showing an alternative embodiment of a base support for mounting and positionally locking the cantilevered arm base end on my belt system.

FIG. 10.7 is a fragmented perspective view showing an alternative embodiment of side pods and flap hinge for my belt system.

FIG. 10.8 is an elevational view showing an alternative embodiment of a double C-shaped rear plate with rear pods for my belt system.

DETAILED DESCRIPTION

Figure 10:
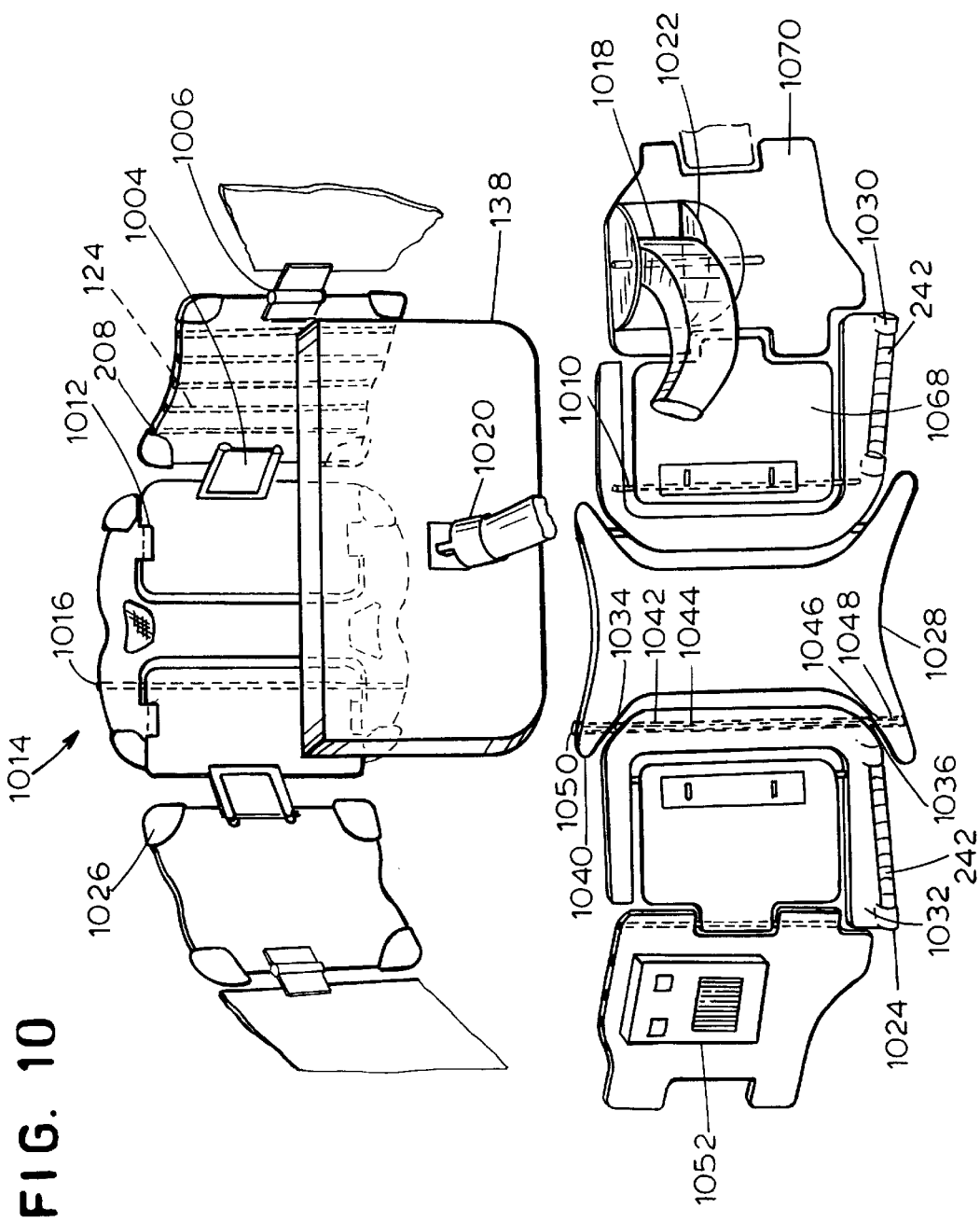
FIG. 10 is a fragmented perspective view similar to FIG. 1 showing an alternative embodiment of my supportive belt system, and a preferred embodiment of the front buckle assembly.
Figure 11:
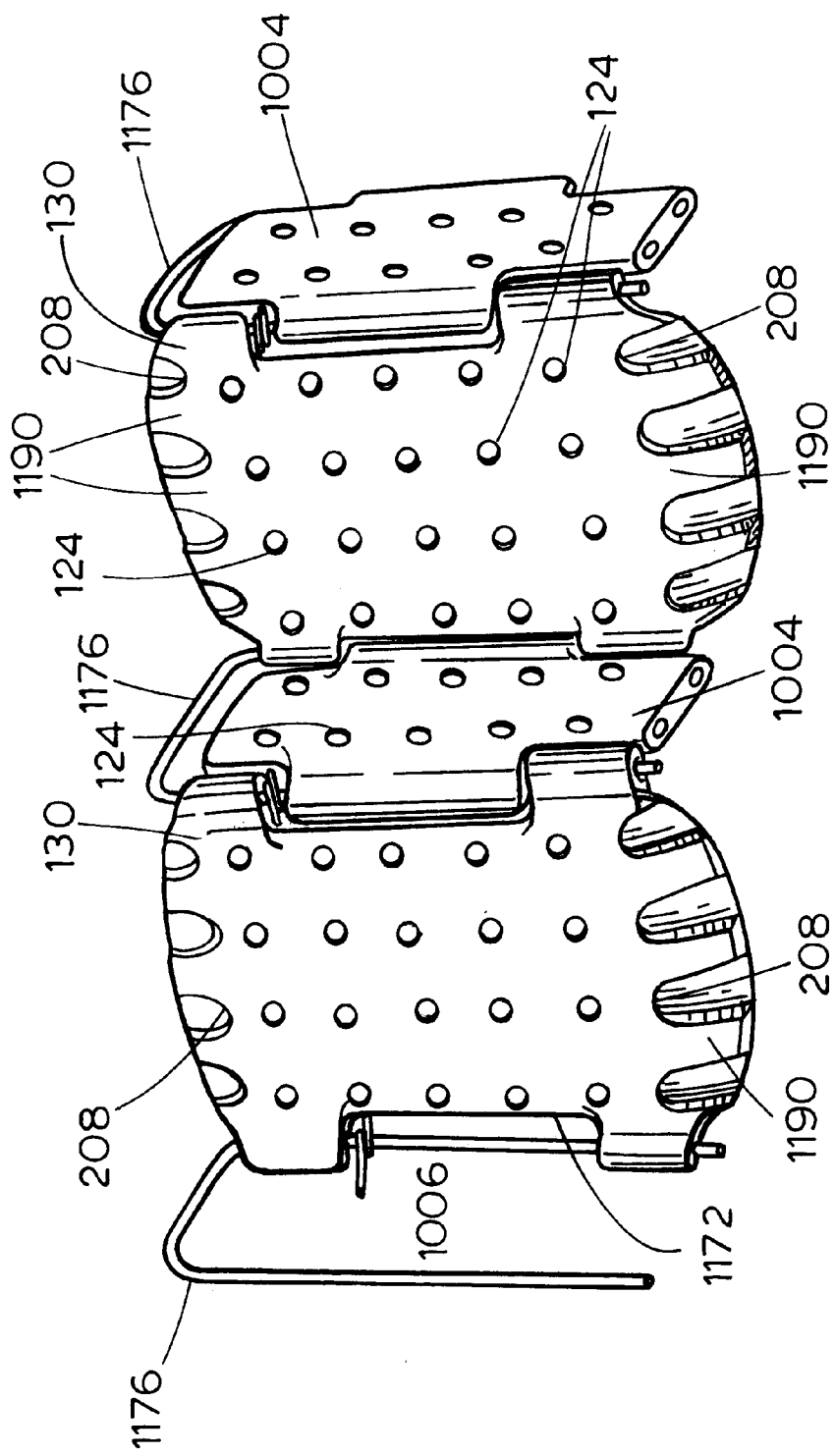
FIG. 11 is a perspective view showing a preferred embodiment of side pods and flap hinge structure for my belt system.
Figure 12:
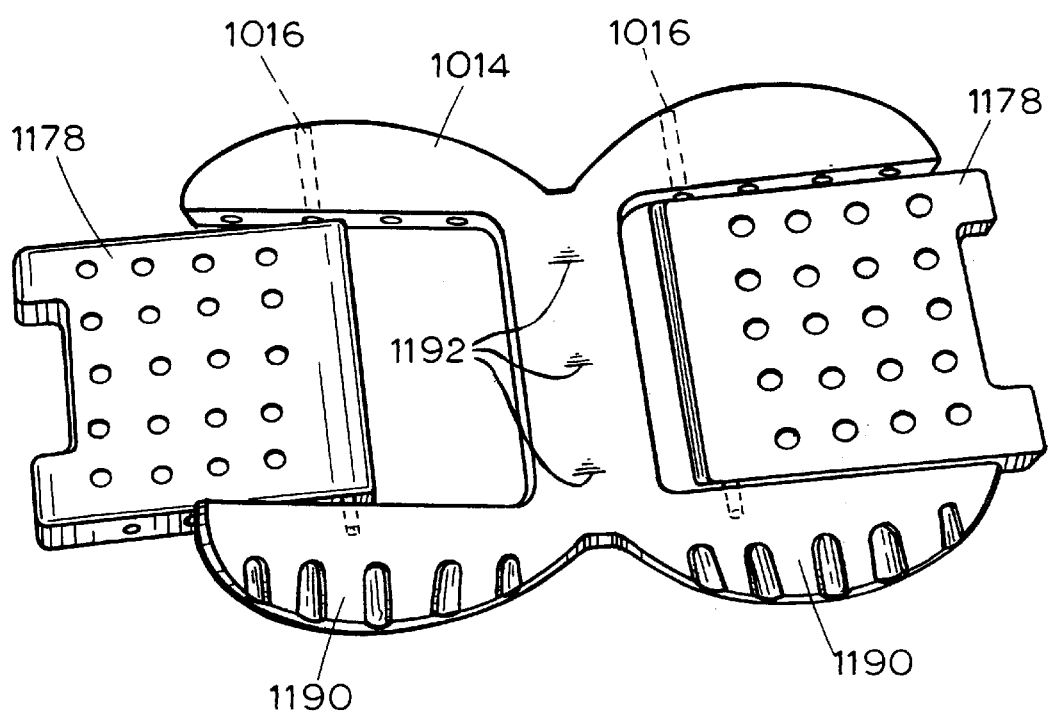
FIG. 12 is an elevational view showing a preferred embodiment of a double C-shaped rear plate with rear pods for my belt system.

In the following description of my supportive belt system, FIGS. 1–9 show a first supportive belt embodiment, FIGS. 10–10.8 show an alternative supportive belt embodiment, with a preferred embodiment of the front buckle assembly and FIGS. 11, 12 show a preferred embodiment of side pod structure and rear plate and rear pod structure to provide a supportive belt having vertical rigidity, horizontal flexibility, size adjustability, and lumbar muscle stimulation features. These features and others are provided by my supportive belt system which is described hereinafter to illustrate the principles of my invention.

Detailed Description FIGS. 1–9

Figure 1:
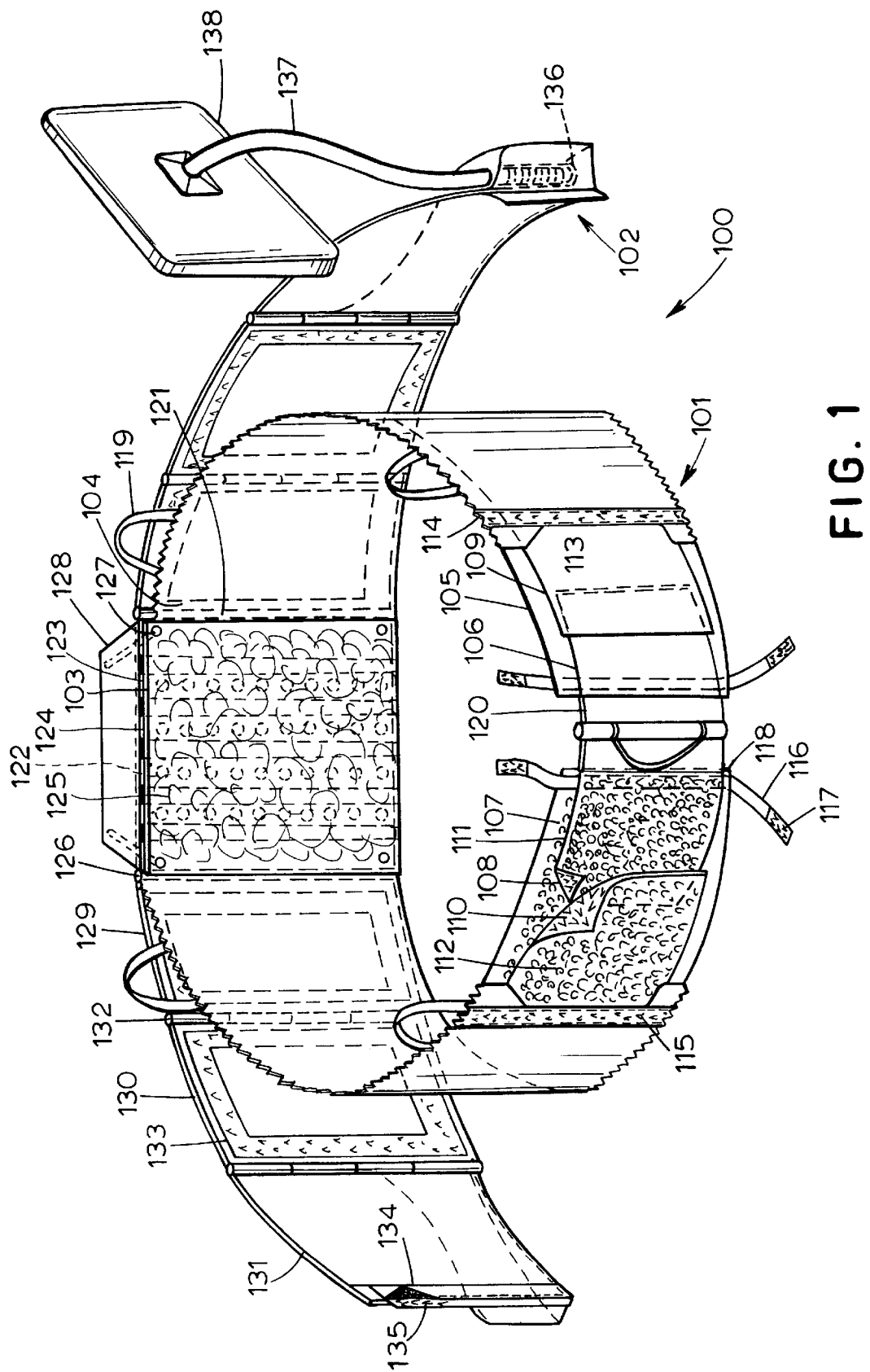
FIG. 1 is a perspective view of my supportive belt system with outer belt portion open.

An embodiment base of my belt device 100 is illustrated in FIG. 1. As shown my belt comprises two concentric belts, an inner belt 101 and an outer belt 102. Belt 101 is shown closed, as when installed on a torso. The outer belt 102 is shown open, for illustrative purposes. Belt 101 starts with two elastic bands on each side with a lumbar pad 103 in between. Pad 103 is of reinforced polyfoam material with a plurality of air holes 122. Pad 103 is sewn to band 105 at a junction site 104. Belt 101 is constructed to facilitate size adjustment by lengthening inner band 105. Band 105 is constructed of sturdy stretchable nylon, both sides. A plate 106, constructed of ABS plastic or similar material, is formed to the shape (front portion) of a torso. Plate 106 material is of sufficient thickness and length to provide adjustability and structural continuity for belt 102. Plate 106 is cut vertically in the middle. Additional torso support is afforded by securing an outer band 109 constructed of sturdy stretchable nylon on the outside of both sides of plate 106. Sewn to the front-end, outer portion of band 105 is a block of loops 107, a portion of hooks and loops fasteners. A block of hooks 108 is secured with contact cement to the inside of plate 106. Band 105 with loops 107 are secured to the inside of adjustment plate 106 with hooks 108. Band 109 is also sewn at junction site 104. Sewn to the front inner portion of band 109 is a block of hooks 110. A block of loops 111 are attached with contact cement to the outer portion of plate 106. A block of loops 112 is sewn to the outside of band 109. Band 105 and band 109 have an outer sleeve 113 constructed of light stretchable nylon. Sleeve 113 is stitched to inner portion of band 105, top and bottom, at a seam 114. Sleeve 113 and band 105 are constructed to allow band 109 to slide back and forth inside. A strip of loops 115 is sewn on the outer portion of sleeve 113, near the end. At attachment site 118 an anchor band 116, of web material is sewn on. A strip of hooks 117 is sewn to the inside of band 116. A plurality of suspender loops 119 (×4) of sturdy nylon are sewn to the top seam 114. To join both sections a quick release latch 120, such as an HCD hinge (U.S. Pat. No. 4,455,711), is attached to plate 106 with a suitable bonding agent such as epoxy (referred to as epoxied or epoxying). Band 109 is secured (sewn) at site 104 adjacent to pad 103. Sleeve 113 terminates at 121.

Belt 102 is made of torso conforming, curved, rigid sections. Typically the sections include: a back pod 129, a side pod 130, and a front pod 131, on both sides; and a rear plate 123. Additional pods can be added to increase the length of the belt. Belt 102 sections attach at pivot points, typically with such as a piano type hinge. Pod 129 attaches to a hinge 126. Pod 129 and 131 interconnect with a hinge 132. Hinge 132 attaches pod 129 to pod 130. An identical hinge 132 attaches pods 130 and 131. The inside of belt 102 has a strip of hooks 133 secured to it with contact cement. Belt 102 also has a small, flat extension called an anchor tab 134 at the end of pod 131. A strip of loops 135 is contact cemented to the front of tab 134. Pod 131 also provides attachment points 136 for an articulating arm 137 such as a Wind Tech, GN-10. Arm 137 supports a variety of devices typically an input/output (I/O) display 138. The rear of belt 102 has a rear plate 123. Plate 123 has a plurality of vent holes 124 that align with holes 122. Pad 103 also has a plurality of foam bumps 125 positioned to further increase airflow and cushion the lumbar region. Plate 123 is attached to pod 129 with such as a piano type hinge 126. Plate 123 also has a mounting site 127 (×4) for the attachment of a processor housing 128.

Detailed Description FIG. 2

FIG. 2 shows the techniques for construction of the outer belt, referring to FIG. 1 belt 102. Referring to FIG. 2, the initial construction step is to heat form an appropriate thickness and density of a closed-cell foam core 200 to the desired torso shape. The dimensions of core 200 are determined by fitment to the torso desired for installation, minus, a 6 cm gap 202, left for clearance. Core 200 is vertically cut 204 (×6). The cut core is arranged to form: plate 123, and pods: 129 (×2), 130 (×2) 131 (×2).

FIG. 2.1 discloses structure of plate 123. The construction steps are as follows:

1. Referring to FIG. 2, the core 200 of plate 123 has a plurality of vertical cuts at an angle to form a 2 to 1 ratio, bottom material being larger than top. Discard unused material.
2. Referring to FIG. 2.1, a plurality of vertically tapering tunnels are arranged from the cut core 206. A void 208 (×5) is created by a uniform arrangement of sections of core 206 plate 123, (twice as wide on top as on bottom).
3. A front lamination 210 and a back lamination 212 are cured prior to assembly. A schedule for laminations 210 and 212 follows: carbon 214, arymid fiber 216, carbon 218, medium weight fabrics, cured in an epoxy resin. All laminations used in constructions that follow use the same schedule.
4. Hinge 126 is trimmed to the appropriate length (slightly shorter than plate 123). An open leaf of hinge 126 is epoxied between core 206 and lamination 212 with the hinge loop facing inwards. Remaining open leaf 224 attaches to pod 129.
5. Core 206 and lamination 212 are epoxied to lamination 210.
6. The assembled plate 123 is drilled in all corners 220 (×4) and T-nuts (×4) 222 are inserted from the front inside.
7. Vent holes 124 are drilled through lamination 210 into voids 208 to enable airflow from body. Pad 103 air holes 122 may be used as a drilling template.

FIG. 2.2 discloses the construction of pod 129 and pod 130. Leaf 224 is epoxied to the rear outside of core 229 under an outside lamination 228, with hinge loop facing inward. Hinge 132 which connects pod 129 to pod 130 is cut slightly shorter than adjoining pods with hinge loop facing inward, and one leaf is epoxied to outer side of core 229 under lamination 228. An inside lamination 226 is epoxied to the inside of pod 129 and pod 130. An identical hinge 132 connects pod 130 to pod 131 in a similar manner. Pod 130 has an front-open leaf 230 for attaching front pod.

FIG. 2.3 discloses construction of pod 131. Leaf 230 is epoxied to the outside of pod 131, in the same manner as previous hinges. An articulating arm area and pad support area are built up with an additional core material 232 (similar to core 229) that is secured to core 229 by a suitable bonding agent. A hole 234 for arm 137 is drilled large enough to allow insertion of a commercial articulating arm such as a Wind-Tech GN-10. An appropriate attachment point 236 angle will allow the operator to adjust display viewing angle as desired. A flange 238, such as Wind-Tech 8040 provides for attachment of arm 137 and is epoxied to point 236 through hole 234. Arm 137 is threaded on to a flange 238. A cable routing tunnel 240 is mortised with a standard cutting tool and carbide bit or similar device. A mounting hinge receptacle pad 242 from a hinge such as HCD hinge is epoxied to area 232. An outside lamination 244 and an inside lamination 246 are epoxied to pod 131 securing all built up areas. Laminations 244 and 246 sandwich the core, added area 232 and hinge as in previous constructions. Tab 134 is an extension of lamination 246.

Detailed Description FIG. 3

FIG. 3 exposes a cut away of housing 128 for belt mounting. Housing 128 can be adjusted to meet the computing requirements of the operator. All internal parts are constructed to minimize size and weight. A housing case 300 is comprised of ABS plastic with an RF reducing coating. Case 300 is mounted to plate 123 with screw 302 (×4) that will engage T-nuts 222 (×4). A housing cover plate 304 is made of aluminum to facilitate device heat dissipation. Plate 304 has hole 305 (×4) also aligned to T-nuts 222 to facilitate mounting by screw 302. An aluminum block functions as a heat conduit 306 and is epoxied on inside plate 304 while positioned above processor 308 to maximize heat transfer. A small slot 310 is cut in the top of case 300 for insertion or removal of PCMCIA cards. A door 312 is utilized to keep contamination from entering slot 310. Inside housing 128 a card stack 314 has a PC 104 standard single board computer card 316, such as a MSM 486 DX/100, always on the outside. A second card in stack 314 is a sound card 318, such as a Crystal MM. A third card in stack 314 is a PCMCIA adapter card, such as a 320 IO/P2. Cards may be expanded or varied to meet the requirements of the operator. Stack 314 is mounted with stand-off 322, screw 324, and T-nuts 326 (×4), inserted from the inside of housing 128. Ribbon cable 328 (2.54 mm center) is a typical ribbon cable used to connect computer functions from stack 314 to a connector Input/ Output (I/O) panel 330. Individual functions will utilize similar ribbon cables with appropriate length and conductor count.

An RF reducing coated, separating partition 332 shields stack 314 from changing circuit/power supply 334 noise. Supply voltages are +5 v and +15 v. These voltages and sense circuits are connected by cable 336 to stack 314 with suitable cables, routed around supply 334 to minimize noise coupling. A door 340 is supplied to facilitate removal and insertion of batteries 338; 4"C" size rechargeable Nicad type. A conductive strap 342 is epoxied to door 340 for electrical connection of batteries 338.

A thumb wheel adjustable 100K ohm potentiometer 344 connected to card 318 mounted on the side of housing 128 permits sound level adjustment. An on/off switch 346 is also mounted on a side and is connected to a power supply 334 to connect stack 314 to batteries. An LED 348 is also mounted on a side and connected to a processor status line 349 to inform the operator when lit that the unit is on. A push button 350 also mounted on a side is connected to a processor reset line 351 to allow the operator to warm boot the system. External, supplemental battery packs can be mounted on the belt.

FIG. 3.1 details connectors (352–374) on panel 330. The list that follows describes a typical bulk head connector configuration on panel 330.

A COM 1 352 (RS 232) connector uses a Micro-D-9 male,
A COM 2 354 (RS 232) connector uses a Micro-D-9 male,
A LPT 1 356 connector uses a Micro-D-25 female,
A Kybd 358 connector uses a DIN-5 female,
A VGA 360 connector uses a Micro-D-15 female,
A Display 362 connector uses a Micro-D-25 female,
A Power 364 connector uses a co-axial power male,
A Mouse 366 connector uses a Mini-D-6 female,
A MIDI 368 connector uses a Micro-D-15 female,
A Spkr 370 connector uses a Mini jack stereo female,
A Mic 372 connector uses a Mini jack mono female,
A Line 374 connector uses a Mini jack stereo female.

FIG. 3.2 shows a typical PCMCIA card 376. A small list of PCMCIA cards that offer expanded functionality for this invention are listed in the table that follows.

| Function | Manufacturer | Source |
| --- | --- | --- |
| Modem w/voicemail | Rockwell | Essex |
| Hard drive | Essex | Essex |
| All points Wireless (messaging) | Megahertz | Mobile Planet |
| IrDA Solutions | JetEye | Mobile Planet |
| GPS | Retki | Mobile Planet |
| CD-ROM | Panasonic | Mobile Planet |

FIG. 3.3 shows a commercial camera 390 that can expand the functionality of this invention. A connector 392 on cable 394 is supplied with a camera such as Notebook TeleCamera. Referring to FIG. 3.1 camera's connector 392 will plug into Kybd port connector 358 on panel 330 or connectors that will be installed in FIG. 4.

Figure 4:
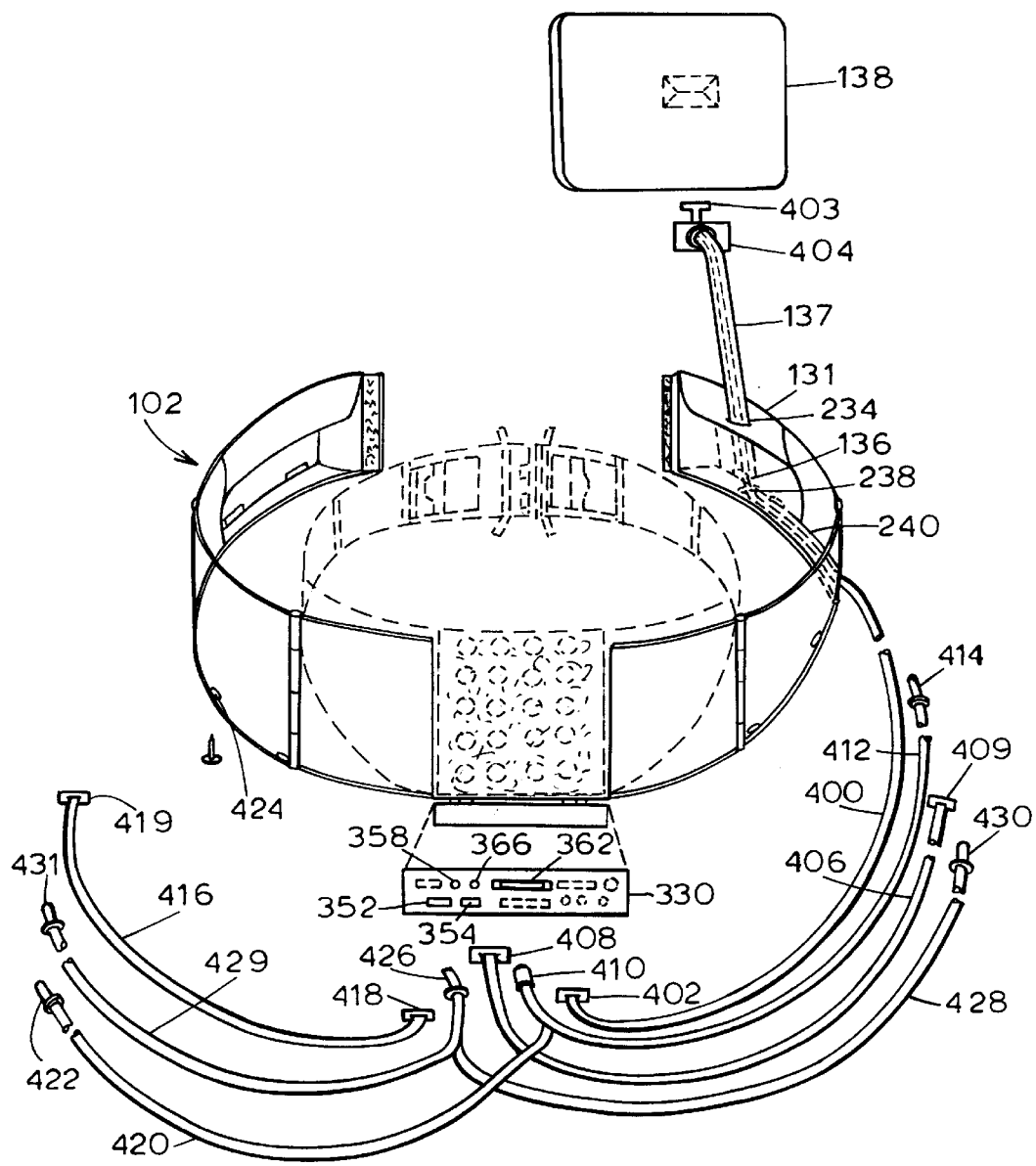
FIG. 4 is an exploded view showing cable routing for my belt.

Detailed Description FIG. 4

FIG. 4, a bottom-front view of a belt 102, discloses the cable routing of this embodiment. Panel 330 is tilted for viewing. Cables routed around the right side (as viewed) are contained in the list that follows.

A display cable 400, 22 conductor double shielded with a Micro-D-25 connector 402, male, bulk head, on panel 330 end and a bulk head Micro-D-25 connector 403, female, on display end, A Com 1 cable 406, 8 conductor shielded with a Micro-D-9 connector 408, female, bulk head, on panel 330 end and an inline Micro-D-9 connector 409, male, on pod 131 end, A Key pad cable 412, 5 conductor shielded with a DIN-5 connector 410, female, bulk head, on panel 330 end and an inline DIN-5 connector 414, male, on pod 131 end, A Mouse cable 428, 6 conductor shielded with a Mini-D-6 connector 426, female, bulk head, on panel 330 end and an inline Mini-D-6 connector 430, male, on pod 131 end.

Cables routed around the left side are:

A Com 2 cable 416, 8 conductor shielded with a Micro-D-9 connector 418, female, bulk head, on panel 330 end and an inline Micro-D-9 connector 419, male, on pod 131 end, A Key pad cable 420, 5 conductor shielded spliced into cable 412 behind connector 410 and an inline DIN-5 connector 422, male, on pod 131 end, A Mouse cable 429, 6 conductor shielded spliced into cable 428 behind connector 426, and an inline Mini-D-6 connector 431, male, on pod 131 end.

Cable 400 is routed through: tunnel 240, outer articulating arm attachment point 136, flange 238, articulating arm 137, and a display flange 404, such as a Wind Tech 8050. Cable 400 is routed through flange 404 prior to installing connector 403 on display 138 end of cable. All other cables route on the respective sides. All cables will be kept neat and secure with such as a Heyclip push mount wire clip 424, PMCW 37-70, using one per pod (cables can be added or deleted according to the operator's requirements).

Mating of cables can be accomplished by joining the corresponding connectors (cable connector plugged into panel 330 connector), as in the following table.

| Cable Connector | Panel 330 Connector |
| --- | --- |
| 402 | 362 |
| 408 | 352 |
| 410 | 358 |
| 426 | 366 |
| 418 | 354 |

Charging power can use any quality 6 v DC 600 ma adapter to line current.

Potential peripheral devices include the following:

Writers and digital receivers for court reporters,
Industrial probes for meters and instrumentation,
Test monitor and control equipment,
Medical equipment and instrumentation,
Label printers, bar code wands, magnetic card readers,
Audio, visual and facsimile transmission and receiving equipment,
Printing devices,
Sensors,
Data recording, processing, and transmission equipment,
Interfaces devices,
Global and site-specific position location equipment,
Emergency response and medical services equipment,
Equipment for or of robotics operations,
Commercial devices will be installed and readied according to manufacturer's operational details.

Figure 5:
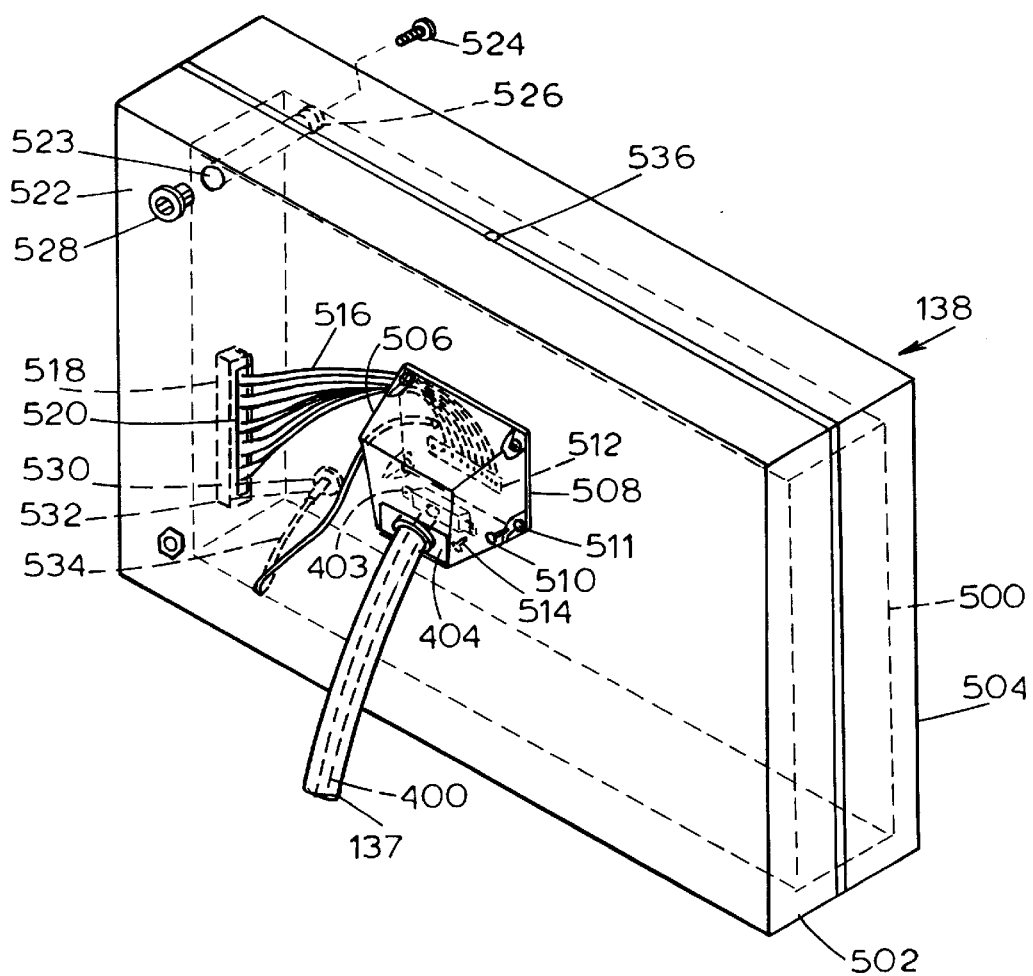
FIG. 5 is a perspective view showing the construction details of a display housing for my belt.

Detailed Description FIG. 5

FIG. 5 is a rear perspective of display 138 for belt use. An LCD screen 500 such as an AND 10135T-30/-Eo is mounted in display 138. A back cover 502 and a front cover 504, constructed with a similar lamination schedule sandwiching core as in FIG. 2.1, comprise display 138. Cover 502 and cover 504 will include an RF reducing coating. Cable 400 is pulled through flange 404. Flange 404, threaded to arm 137 is epoxied to a display housing adapter 506. A display connector 512 such as a Micro-D-25, male is mounted to plate 508 with a small machine screw 514 (×2). Connector 403 is installed on cable 400. Connector 403 is mated to connector 512. Connector 512 is connected to screen 500 by a 22 conductor 1.25 mm pitch ribbon cable 516. Cable 516 is terminated with a ribbon cable connector 518 (feed through version). Connector 518 is pushed on a screen connector header 520. Hole 522 is drilled (×4) in cover 502 to align with screen hole 523 (×4). Screen 500 mounts to section 502 with screw 524 (×4) through hole 523 (×4), stand off spacer 526 (×4) and threaded into T-nuts 528 (×4). T-nuts are inserted from the rear of cover 502 into hole 522 (×4). A small area is drilled for a hole 530 (×5) to transmit audio waves. Behind hole 530 a suitable small 8 ohm speaker 532 is epoxied to inside of cover 504. Speaker wires 534 are routed from speaker 532 to connector 512. Cover 504 is held to section 502 with a small drop of epoxy in the middle of each side 536. Self tapping screw 510 (×4) screwed into hole 511 (×4) secures adapter 506 to section 502.

Detailed Description FIG. 6

FIG. 6 shows mounting of a peripheral, commercial device 600 on a typical pod 130 of belt 100 with a mounting strap system 602. FIG. 6.1 displays the details of strap system 602, a set of 4 overlapping sturdy elastic straps 604 sewn together to form a rectangle. An attaching strap 606 (×2) routes over device 600 and belt 102 to inside of belt 102 where a strip of loops 608 sewn to strap 606 attach to hooks 133. Lower strap 610 is of web material and routes under device 600, belt 102 and attaches loops 612, sewn on the inside, to hooks 133.

FIG. 6.2 details a utility hook strap 613 mounting device. A "J" hook 614, of any commercial "J" belt hook, is configured by sewing together in a V form a pair of sturdy web material attaching strap 616 (×2) with hook 614 sewn in the center. A pair of straps 616 route over to belt 102 inside where a sewn on strip of loops 618 attach to hooks 133.

FIG. 6.3 details a loop fastener strap 620 for mounting correspondingly equipped devices (hooks portion). A loop pad 621 will attach devices with hooks (operator supplied). Pad 621 is sewn to an attaching strap 622 (×2) of web material sewn together in a V form. Straps 622 route over to belt 102 inside where a sewn on strip of loops 624 attach to hooks 133.

Detailed Description FIG. 7

FIG. 7 displays belt 100 in a complete preferred embodiment mounted on a torso giving perspective to constructions for mounting of I/O devices. Belt 100 is summarized in this paragraph and key pads installation details will follow. Inner belt 101 is shown with pad 103 featuring bumps 125 and air holes 122 for comfort. In addition, inner belt 101 has plate 106 positioned in between either side to facilitate size and lumbar tension support adjustment. Outer belt 102 is shown secured around a torso installed inner belt 101. Support for arm 137 and display 138 is shown. Belt 102 is also shown supporting housing 128. Additionally, a surface is cantilevered (with hinge rotation) from front pod 131 to support typical articles or devices such as key pads 700, Floating Arms™ (FA), (U.S. Pat. No. 5,311,210). Key pads 700 are mounted with hinge body 702, HCD hinge body. Body 702 is mated to pad 242 containing the mating hinge for mating with hinge body 702. Key pad 700 could be cantilever mounted to the pod elements of the embodiment of FIG. 10, such as pod 1070, or as illustrated in FIGS. 10 and 10.1 by means of the pad and hinge 242 to the buckle C-sides 1030, 1032. Completing a summary of belt 100 is peripheral device 600 mounted with strap 602 on belt 102.

FIG. 7.1 discloses the details of installing key pads 700. Key pads 700 are modified to adapt to belt 100. FA Key pad cable 704 is modified to permit installation on and removal from belt 100. Cable 704 is separated at cut 706, 21 cm back from each pad. An inline DIN-5 connector 708 male on left and an inline DIN-5 connector 709 on right are installed on the key pad side of cut 706. The remainder of cable 704 is not used and can be discarded. FA Mouse cable 711 is also separated at cut 706, and an in line connector 710 a mini-D-6 on left an inline mini-D-6 male is also installed.

FIG. 7.2 shows the connection of cables for key pads 700 on belt 100. Right connector 414 on cable 412 mates to connector 709. Connector 430 on cable 428 is not used in this embodiment and should be protected by installing manufacturer's cover installed and cable 428 should be tied back. Connector 422 on cable 420 is mated to connector 708. Connector 431 on cable 429 is mated to connector 710. Plate 712 attaches to pad 242.

FIG. 7.3 discloses plate 712 parts.
1. A thick closed cell foam core 714,
2. Lamination 716 is epoxied around core 714 to strengthen and protect,
3. Hinge body 702, HCD hinge body is epoxied on top of lamination 716,
4. FA adapter plate 720 is epoxied, with slot out, to the front of plate 712.

Detailed Description FIG. 8

FIG. 8 depicts a rear view of a commercial Personal Digital Assistant (PDA) embodiment of belt 100. This embodiment is depicted using a PDA such as a Sony® Personal Intelligent Communicator, PDA 800. PDA 800 is mounted by epoxying to its back a slide foot bracket 802, fashioned of carbon fiber fabric in an epoxy resin. Foot 802 will mate to a slide tongue bracket 804, fashioned of carbon fiber fabric in an epoxy resin, epoxied to the front of adapter 506. A support for this embodiment is similar to a typical belt 100 configuration with adapter 506 on flange 404 supported by arm 137 mounted on flange 238 on pod 131. Referring to FIG. 3, PDA 800 embodiment can be used with or without processor 128 (and referring to FIG. 4 cabling 400–431 is also optional depending on operator requirements). Referring to FIG. 8 PDA 800 is shown without processor 128. A supplemental 12 v battery pack 806 (lithium-ion) is cabled with a 2 conductor shielded, 22 ga. cable 808 and a 12 v co-axial mini-connector 810. Connector 810 is plugged into 12 v co-axial receptacle 811 on PDA 800. Battery 806 can be mounted in place of device 600 with strap 602. Additionally, a typical type 2 PCMCIA card 376 is shown prepared to be slid into slot 830. Devices requiring cabling 832 can be routed external to arm 137 for ease of installation/removal. Device 600 such as the CD-ROM is shown with cable 832 and mounted with strap 602. Power is controlled by on/off switch 834. Back light is controlled with on/off switch 836. The amount of back light is adjusted by adjustment knob 838.

FIG. 8.1 shows cable routing for devices in a typical PDA embodiment. A telephone 812 connector 813 is connected to receptacle 814 on PDA 800 (standard telephone line jack) with cable 815 (standard telephone line cable). An earphone 816 is connected to receptacle 817 on PDA 800 by such as a connector 818 with cable 819 (3 wire, stereo, shielded). Port 820 on PDA 800 is available for connection to such as a keyboard 822 (Sony® PCIP-K1). Connection is facilitated by keyboard cable 824 and connector 826 (supplied with keyboard 822). Keyboard 822 mounted on a bracket 828, made of carbon fabric in an epoxy resin. Bracket 828 resembles referring to FIG. 7, adapter 712 with one change. On bracket 828 foot 840 replaces plate 720. A bracket 802 is epoxied to the inside bottom of keyboard 822 to facilitate mounting to adapter 828 (both sides).

Detailed Description FIG. 9

FIG. 9 shows a front top view of belt 100 placed on a stable surface The following figures, 9.1–9.4, prepare my belt for transportation.

FIG. 9.1 shows a front top view of belt 100 initially being prepared for transportation. Belt 100 is displayed open with arm 137 and display 138 laid out flat on a surface. Latch 120 is open.

FIG. 9.2 shows a front top view of belt 100 laid flat with left pod 131, with arm 137 and display 138 folded inwards and laid over pad 103.

FIG. 9.3 shows a front top view of belt 100 with arm 137 manipulated so that display 138 rests over pods 129 and 130.

FIG. 9.4 shows a front top view of belt 100 with right pod 131 folded in and secured with latch 120.

FIG. 9.5 shows a front top view of belt 100, as a stand alone embodiment. Display 138 is rotated 180 degrees on arm 137. Left side connectors: 409, 414, and 430, on right side connectors: 419, 422, and 431 are available for device attachment. Pads 242 are available for physical attachment of devices.

FIG. 9.6 shows a front top view of belt device 100, as a workstation embodiment, with reversed key pads 700. Hinge body 900, HCD hinge body, is epoxied to the front of key pads 700 to permit attachment to pad 242 on pod 131. Connector 414 is connected to connector 708, and 422 is connected to connector 709. Connector 430 is connected to connector 710. Connector 431 is not connected in this embodiment, connectors not in use should be stowed safely and kept covered with manufacturer supplied cover. Display 138 and arm 137 are adjusted for workstation applications. As in FIG. 9.5 additional cables may be also used for electrical connection to devices as needed.

Detailed Description Summary FIGS. 1–9

From the description above a number of advantages of my belt system become evident; wearers will:

(a) Enjoy easy to use support for various packages, articles, or devices.

(b) Experience improved efficiency with individual control for distribution of packages, articles, or devices.

(c) Receive reduced lower back strain with adjustable lumbar support and stimulation (d) Experience heat relief with airflow in the lumbar region and throughout the belt structure.

(e) Operate more efficiently with tension adjustment and quick release convenience.

(f) Utilize stability of display interface to adapt to demanding tasks and situational requirements.

(g) Reduce time wasting return to workstation trips or looking for a suitable support for "brick" computers.

(h) Focus on tasks with improved clarity, rather than adjusting to poor ergonomics of "brick" computers.

(i) Experience fewer accidents and damage to equipment with belt improved mounting.

(j) Advance to higher levels of output based on new found efficiencies, expanding user acceptance.

(k) Satisfy a wider range of requirements with the display adjustment flexibility.

(l) Appreciate fewer environmental distractions with the strength, lightness and ruggedness of advanced materials designed in.

(m) Waste fewer resources on maintenance and upgrades with commercial standards.

(n) Efficiently address varied tasks and requirements with multiple morphologies.

Operation FIGS. 1, 3, 4, 5, 7, 8, 9

The manner of using my belt system simply requires configuring, installing, adding devices, powering up, and loading software. To use my belt system, the wearer initially configures and installs the belt system. After that the wearer simply puts the belt system on or configures it for stand alone use, and powers it up. My belt system fuses 3 basic functionalities; portable computing, mobile communication, and torso support. Configuring my belt system is disclosed in the following paragraphs.

Operation; Configuring

1. The first configuration step requires referring to FIG. 3, that batteries 338 in Display 128 are fully charged, using manufacture's instructions.

2. Referring to FIG. 4 connectors 409, 414, 419, 422, 430 and 431 are available for peripheral devices (external to this invention) as desired.

3. Cables and connectors not used can be eliminated or secured and protected by looping cables back and covering connectors with manufacturer supplied connector cover.

Referring to FIG. 5 operation of display 138 is controlled by processor in FIG. 3.

Operation; Installing

FIG. 1 shows my belt system in a basic configuration for torso installation.

1. Belt 101 is wrapped around the torso and secured when desired size and tension are reached by undertaking the following steps.

2. Securing of belt 101 is accomplished by pressing hooks 108 of plate 106 against corresponding loops 107.

3. Hinge 120 is normally secured except for removal of belt 100.

4. Tension and support are now adjusted with outer bands 109 (left and right) being pulled forward with an inward direction concurrently until the desired tension and support are achieved. Band 109 is secured with its inside hooks 110 being pressed against loops 111 on the outside of plate 106.

5. Belt 102 is now swung forward and inward until closed around belt 101.

6. Hooks 133 on the inside of belt 102 are pressed against loops 115, and loops 111 on the outside of plate 106.

7. Belt 102 is secured with straps 116 being stretched around top and bottom of belt 102 with hooks 117 pressed on loops 135.

8. Referring to FIG. 7 there is shown the completed installation of belt 100, with key pads 700.

9. Referring to FIG. 7.2 key pads are secured to adapter 712.

10. Adapter 712 is secured to pad 242.

11. Connectors 708 and 709 are mated to connectors 414 and 422.

12. Connector 710 is mated to connector 431.

Operation; Adding Devices

Referring to FIG. 3.2 peripheral (external to this invention) devices and PCMCIA card 376 is installed. Card 320 in FIG. 3 is equipped with two slot protector cards when they do not contain cards.

1. Hole 310 is available for insertion of referring to FIG. 3.2 card 376 as selected by the operator.

2. Referring to FIG. 3 with power off, press eject button 321 adjoining card slot selected for use. Remove protector card.

3. Insert operator selected Type 2 PCMCIA card 376, label up, arrow inwards, pushing until pins and connectors engage.

4. Additional instructions are provided by manufacturer.

5. Referring to FIG. 3.3 in a typical use an auxiliary camera 390 can be installed by connecting 392 to referring to FIG. 4 connector 414 or 422.

6. Referring to FIG. 7, the operator can now position display 138 for desired viewing position.

7. The operator with belt 100 installed can stand, sit, or walk. Operator should position display 138 to not obscure vision when. moving or in traffic.

Operation; Powering Up

Referring to FIG. 3 initialize processor 308 by turning switch 346 to on position and perform system checks.

Operation; Loading Software

Referring to FIG. 3.1 load selected software through the appropriate connector port on panel 330.

Operation; PDA Embodiment

Referring to FIG. 8, with modified adapter 506, substitute a commercial Personal Digital Assistant (PDA) 800 for display 138; FIG. 1 on arm 137.

Referring to FIG. 8, slide bracket 802 onto bracket 804. Adjust PDA 800 for desired viewing position by articulating arm 137.

Referring to FIG. 8.1, connect lines from telephone 812 and headphones 816 to PDA 800. Keyboard 822 slides onto adapters 828 on belt 100. Electrically connect keyboard by inserting connector 826 into port 820.

Referring to FIG. 8, attach auxiliary battery pack 806 and install up to two PCMCIA cards 376 per PDA manufacturer instructions.

Initialize PDA 800 by momentarily pressing on/off switch 834 towards the top of PDA 800.

Operate device 600 per manufacturer's instructions including connection to PDA.

Back light on/off switch 836 is set as desired for viewing. Amount of back light is adjusted by knob 838.

Detailed operation instructions are contained in Sony® Magic Link™ user's guide PIC 2000.

Operator uses keyboard 822, PDA 800 and device 600 to accomplish task.

Operation; Transportation

The steps in FIGS., 9–9.4, prepare my belt for transportation.

1. Referring to FIG. 9, my belt is shown sitting on a surface with latch 120 secured.
2. FIG. 9.1 shows my belt laid flat on a surface.
3. Referring to FIG. 9.2, pod 131 left side (right as viewed) with arm 137 and display 138, are folded inward and laid over pad 103.
4. Referring to FIG. 9.3, arm 137 is manipulated onto pods 129 and 130.
5. Referring to FIG. 9.4, right pod 131 is folded inward and secured with latch 120 to left pod 131.
6. Belt system is now ready for shipping or carrying in an appropriate container.

Operation; Stand Alone

The following steps explain how to use belt in stand alone mode FIG. 9.5.

1. From FIG. 9 rotate display 138 180° on arm 137. Note do not rotate beyond 210°.
2. Belt system can now be operated as a stand alone station. Select devices to connect at 409, 419, 414, 422, 430 and 431 according to user's needs.

Operation; Workstation

FIG. 9.6 shows a top, front view of my belt as a workstation.

1. Secure hinge body 900 to pad 242, both sides to attach key pads 700.
2. Connect 708 to 414 and 709 to 422 to electrically connect key pads.
3. Connect 710 to 430 to install mouse. Cable 429, not used in this embodiment, should be stowed. Connector 431 should be covered with manufacturer supplied cover.
4. Referring to FIG. 3, initialize processor 308 by turning switch 346 to on position; perform system check.
5. Referring to FIG. 9.6, position display 138 by articulating arm 137.
6. My belt can be operated as a standard workstation. Additional devices selected by user, FIG. 4, can be incorporated by connecting required cables per manufacturer's instructions.

Advantages and Industrial Applicability

It can be seen that the functional fusion by my belt system improves upon existing mobile computing and supporting belt art. The operator of my belt system will experience expanded mobile computing performance with less effort. The wearer of my belt system will enjoy adjustable support for improved endurance plus comfort with endurance enhancing airflow through the lumbar region and throughout the belt structure.

The multiple embodiments of my belt system expand the range of use for operators broadening his or her effectiveness. In addition my belt system gives the user the ability to carry, support and utilize devices supported by the torso and in a configuration that also supports the torso. Further, my belt system facilitates distribution of articles, packages and devices with I/O support. This configuration enables the user to utilize many kinds of sensing, receiving, transmitting and computing devices with the minimum amount of effort. Some additional functions for my belt system easily accommodated, in a cost effective way include:

Voice recording, recognition and text to speech conversion.

Speech synthesis, digital to audio conversion.

These type functions are a combination of commercial hardware and software and further demonstrate the benefits of incorporating commercial standards into my belt system.

The I/O display panel as supported by my belt system far surpasses the flexibility and utility of a current hand held device. The previous art devices compromise the use of one hand for operator and subjects operator to repetitive strain injuries, limited utility and poor performance. My belt system display is supported and not as subject to loss and breakage from carelessness, fatigue or human rebellion (at lugging an uncomfortable oversized device around all day).

Heretofore the only mobile alternative to a hand held device was an eye piece or other head mounted viewer. These viewers are available in various configuration and quality but all either distort or block vision of at least one eye. Accordingly, these viewers compromise and distract from human to human discourse. Such distractions compromise a user's productivity. My belt system has the additional advantages in that it provides unique device support, it provides support and distributes loads from such as packages, articles and equipment around the torso, it extends strength and endurance of a torso with ergonomically correct lumbar support, it limits body temperature elevation in the critical lumbar region by eliminating air blocking constructions, and supplying airflow with air tunnels, it provides adjustable size and tension, it provides support for a stable interface I/O, previously not available in mobile applications, it improves wearers ability to stand, sit and walk while wearing a computer or carry my belt, it provides relief from aggravated strains resulting from compromising operating positions caused by poor device ergonomics designs, it provides improved safety with a breakaway design to protect wearer and others near by, it provides ease of transportation and operation increases user acceptance over existing art, it provides improved flexibility with multi-adjustability of interface for viewing, it provides robust design and advanced materials to improve on existing art ruggedness, it provides intelligent use of commercial standards reducing user operating and upgrade costs, it provides innovative construction, allowing multiple morphologies; wear, carry, and desktop.

Additional advantages of my belt system taken in combination are operators are offered mobile processing power without the use of intrusive head gear or goggles, laptop functionality is provided without a classical brick configuration, mobile industrial applications, with convenient facilities for probes, sensors, expanded battery capacity and communications are enhanced beyond existing art, repetitive strain injuries are reduced by design, specifically wrists, arm, shoulders, neck and lower back will experience less inappropriate loading (the principle cause of these type of injuries), mobile supportive on line access is now available as powerful as in a desk configuration.

Although the description above contains many specifics, these should not be construed as limiting the scope of my belt system, but merely providing illustration of some of the present embodiments of my belt system. For example the inner belt can be of various combinations of canvas, aramid fibers, elastic or any material that will provide the necessary support for the users torso lumbar and attachment of a rigid outer belt. The outer belt can be constructed of any light, stiff-load bearing material composed of fibers (carbon, aramid fiber, glass, etc.) in a resin matrix, other advanced composites, material with vertical stays plastics or alloys or combinations. The articulating arm can be constructed of any material or configuration to benefit the user. PC 104 standard is discussed but any commercial standard processor or custom configuration can be used to accommodate the user's requirements. The processor housing can be hardened, insulated, and waterproofed as required. Wiring and cabling can be simplified by substituting the Universal Serial Bus (USB) for the RS 232 as presented in the detailed description of this specification. USB's 4 wire configuration and concentrators will allow multiple devices and common wiring. High speed device connections (displays, camcorders, etc.) can use fiber optics and the IEEE 1394 standard. Commercial RF or IR controlled peripheral devices can eliminate most cabling. Subcutaneous or galvanic bus communication schemes or MIT's Body Net could also eliminate most cabling and as these technologies mature, lend themselves to applications on my belt system.

Therefore, it can be seen that my belt system's unique structure; vertically rigid, horizontally flexible and conforming, torso-cantilevered support, and articulating arm, facilitate an operators ability to improve performance and task accomplishment. These improvements are realized when the operator employs my belt system morphologies; wearing on a torso, stand alone, desk top and hand carry. My belt system's flexibility extends communications and therefore the power available to wearers. The simplicity of adding functionality with commercial (or custom) hardware and software operating systems broadens applications of my belt.

Prior devices have created a powerful selection of technical functionality. These technologies will assist and improve most human's task performance. The inhibitors for individuals realizing the benefits of prior devices are integration, interface, and flexibility. My belt system generally address prior device's deficiencies providing:

Portable integration for device connection and distribution of loads;

Adjustable support interface (without hands or head commitment);

Flexible-multiple morphologies allow operators to adapt to tasks.

Specifically, in the table that follows is a small sampling of embodiments of my belt, resolving the aforementioned deficiencies of prior devices,

| EMBODIMENTS | BELT CONFIGURATION USING COMMERCIAL DEVICES SUCH AS | EXAMPLE |
| --- | --- | --- |
| Industrial Workers | Scanner (into COM1 or 2), IR LAN, Messaging, Nodem, Storage device. | Workers can wear my belt on shop floor, place on a desk top in an office and carry in transportation |
| Service, Repair, Maintenance | IR LAN, Messaging, Modem, Camera. | Mechanics can place my belt on a seat or console and adjust display for viewing while working under a dashboard for on-line documentation, or listen to instructions with synthesized speech. A camera will facilitate transmitting images for remote diagnosis. |
| Field Technicians | GPS, Storage, Camera, Modem, Messaging. | Geologists using my belt can perform in situ data collection, correlation and augmentation, then morph my belt to continue analysis and finalize a report in the office or elsewhere. |
| Performance Musicians | Keyboard (musical) and guitar use MIDI interface. | Musicians using my belt combine lab- digital audio with live performances and remote sound control. |
| Travelers | Modem, GPS and maps, Messaging, and Camera. | Travelers using my belt will enjoy office capabilities in a terminal waiting area and in route, they can carry my belt in line and for security checks. Maps and directions are available in standalone when placed on a console or seat in rental car, communicating and teleconferencing in motel room with desk top embodiment. |
| Point of Sale, | IR LAN, Messaging, | Clerks using my |

-continued

| EMBODIMENTS | BELT CONFIGURATION USING COMMERCIAL DEVICES SUCH AS | EXAMPLE |
| --- | --- | --- |
| Service, and Delivery Workers | Scanner (into COM1 or 2), Cantilevered work surface (key pads removed). | belt are more flexible and efficient with free hands, Service auto personnel can receive service requests at vehicles, improving problem diagnosis, Delivery personnel function as with prior art but hands are free for delivery tasks. |
| Divers | Electronics must be sealed! Interface to equipment status, air supply, depth etc. | Divers using my belt can mount air tanks on processor housing. |
| Sport Team Support | Messaging, Modem, GPS, Camera. | Racing pit crews can communicate with remote spotters for track condition, factory experts for problems, on line for weather data and safety crew coordinatio in emergencies. |
| Group presentations | Presentation software, IR LAN, Messaging, Modem. | Presenters can use my belt as a mobile lectern and personnel TelePrompTer ™, Real- time information is available on stage with electronic connections. |
| Emergency personnel | Modem, IR LAN, Messaging, Camera. | Firefighters wearing my belt can receive floor plan updates in buildings and transmit and receive status, maps, and camera images in situ. |
| Virtual gamers | Modem, IR LAN, Messaging, Camera. | Gamers wearing my belt can form teams that compete with virtual teams. |
| Photographers | Camera, Modem, IR LAN, Messaging. | Photographers wearing my belt can use digital pictures to replace Polaroid ™ snap shots, digital images can be transmitted electronically to labs for printing. |

Note: Users supplied devices are inserted into the port shown in above table.

Detailed Description FIGS. 10–10.8

Referring to FIG. 10, a disclosure of an improved alternative embodiment of my invention is shown. This embodiment implements upgrades to the first embodiment, referring to FIG. 1, belt 100. Specific changes are as follows. Referring to FIG. 1, belt 101 and belt 102 are functionally combined—referring to FIG. 10 into a belt 1002. Size adjustment and tension are provided by a flap hinge 1004 with a radial spring 1006. These modifications avoid usage of temperature and wear sensitive elastic. Referring to FIG. 1, latch 120—referring to FIG. 10 is now an improved buckle 1008. Buckle 1008 is constructed in a similar manner—referring to FIG. 2.2 core 229 and laminations 226 and 228. Referring to FIG. 10, buckle 1008 has a core 229 covered in laminations 226 and 228. Buckle 1008 permits size adjustment with a sliding pin 1010. An alignment guide 1012 approximately 15 mm high and 12.6 mm long fashioned of carbon fiber or similar material is provided to simplify installation and adjustment of belt 1002 on a torso.

Referring to FIG. 1, plate 123 is now—referring to FIG. 10 an improved plate 1014. Plate 1014 consisting of three parts is adjustable in size with long pins 1016. Referring to FIG. 1, arm 137 and display 138 are now—referring to FIG. 10, with an improved arm 1018 and a flange 1020 capable of supporting display 138 (or a larger display). This combination will position adjust, tilt, rotate and not sag during usage. Various configurations of goose necks and universals can also be adapted to arm 1018 allowing an operator to adapt to most any task or personal preference. A display base 1022 provides adjustment and firm positioning support. Additionally base 1022 provides "break away" safety in the event of any part of device receiving shock energy from such as a collision because the device holds the arm in place, but no so rigidly that it will not release if struck hard. All components of belt 1002 are flared 1024 on bottom approximately 10 degrees outward and additionally have foam 1026 on corners for cushioning of torso and hip protrusions.

Referring to FIG. 1, as in plate 123 holes 124 and referring to FIG. 2.1, tunnels 208 are further utilized—referring to FIG. 10 now all belt 1002 elements have similar cooling with tunnels 208 and holes 124. Buckle 1008 is comprised of 3 pieces; center a stylized form of a capital I 1028, left side a squared C buckle member 1030 with long chin, right side a C buckle member 1032 is a mirror image. C buckle member 1030 and 1032 are pinned to I member 1028 with a left pin 1034 and a right pin 1036. Pins 1034 and 1036 are 5 mm in diameter made of brass or similar material with enough length to support belt 1002. Pin 1034 inserts into a 5 mm ID sleeve 1038 of steel or similar material epoxied into a 6 mm hole 1040 at the top of I 1028 Pin 1036 continues through a similar sleeve 1042 epoxied into hole 1044 in C member 1032. Pin 1036 concludes in a similar sleeve 1046 epoxied into hole 1048 in bottom of I member 1028. This configuration facilitates rotation around I member 1028 and thus conform to a torso while still maintaining rigid vertical support for devices. A dab of epoxy 1050 on top will secure pins 1034 and 1036. A touch pad 1052 such as a Cirque Easy Cat (CRQ GPB 160) or similar device is included for operator interface. Any pointing device such as a track ball or equivalent device can be used. Pad 1052 can be attached with hook and loop type fasteners or attached as preferred by the operator.

Referring to FIG. 10.1, C member 1030 of the buckle 1008 has a top hole 1054 and a bottom hole 1056 to facilitate insertion of pin 1010 from adjoining pod. Holes 1054 and 1056 are 5 mm in diameter typically spaced ~126 mm apart allowing size adjustment by appropriate selection. Referring to FIG. 2.3, receptacle for key pads pad 242 is—referring to FIG. 10.1, pad 242 is also included on buckle member C 1030.

Referring to FIG. 1, pod 131 is—referring to FIG. 10.1 now split vertically in the middle to improve conformation to a torso. This modification is accomplished with a vertical center line 1058 drawn in the middle of pod 131. Pod is align drilled following line 1058 to make a 6 mm hole 1060. A 5 mm ID sleeve 1062 of light steel is inserted into hole 1060 (sleeves are lightly bonded to improve strength). A vertical parallel line 1064 is drawn 5 mm horizontally on either side to outline the cuts. The pod is vertically sectioned to leave a tab. The cut follows a pattern 1066 as shown. Resulting is a pod 1068 from the front pod 131 and a pod 1070 from the back pod 131. Pod 1068 and 1070 are reassembled with a 5 mm rod 1072 brass or similar material of sufficient length to support belt. Rod 1072 is inserted through sleeve 1062. A dab of epoxy 1074 on the top will secure rod 1072. Size adjustment is accomplish with pin 1010 top and bottom. Pin 1010 is 5 mm diameter brass or similar material, 30 mm long. Pin 1010 is cast in 20 mm×15 mm×10 mm tab 1076 fashioned of plastic or similar material. Tab 1076 features a 10 mm protrusions 1078 for thumb or forefinger gripping. Tab 1076 has a mirror image on bottom (both sides). Pin 1010 and tab 1076 are contained in a 60 mm×18 mm×10 mm cavity 1080 mortised out of pod 1068, behind a 5 mm lending edge. They are held normally closed with a light tension spring 1082, 25 mm long 5 mm diameter of steel or similar material. A screw 1084, 4 mm of plastic or similar material is inserted from the rear. Screw 1084 secures a stop nut 1086, 4 mm ID and 10 mm width, of plastic or similar material. Nut 1086 is centered between tabs 1076 (top and bottom) to limit travel and allow attachment of a front cover 1088. Cover 1088 is fashioned of carbon fiber or similar material, large enough to retain and protect pins 1010 (top and bottom). Cover 1088 is attached by bonding or as desired. Pin 1010 is opened by squeezing protrusion 1078 top and bottom together with one hand per side typically using thumb and forefinger. Pin 1010 will engage hole 1054 top and 1056 bottom when aligned and protrusions 1078 are released.

Referring to FIG. 10.2 details of arm 1018 are disclosed. Center of arm 1018 is core 229, 300 mm long, 20 mm×20 mm square (with rounded edges) formed to duplicate the position an operator would hold a hand-held display for writing or monitoring. A base end 1092 of arm 1018 has a 6 mm hole 1094 with a sleeve 1096 of copper or similar material with a 5 mm ID. A 5 mm deep, 12.5 mm long and 20 mm wide hole 1106 is mortised into bottom of arm 1018 just out from hole 1094. Core 229 is sleeved with carbon fiber sleeve braid 1090 such as Adkins and Pierce L57L75X (×2) epoxied around core 229. A display end 1098 of arm 1018 is rounded to 16 mm and threaded 1.06 threads per mm to allow installation of flange 1020. Into hole 1106 a left rod 1102, 5 mm brass and a right rod 1104, 5 mm brass rod on are bonded. Rod 1102 and 1104 are typically approximately 12.5 mm long. A slot 1106 is formed between rod 1102 and 1104.

Referring to FIGS. 10.3(a) and 10.3(b) there is shown the installation of display 138 on arm 1018. A flange 1020 Shure # SHUA25CM or equivalent is modified as follows. Microphone sleeve 1108 is cut away and discarded along ridge 1110 as shown. Remaining portion of flange 1020 is bonded with epoxy or similar bonding agent at a location 1112 to adapter 506 above cable penetration at flange 404. A locking collar 1114 is threaded completely on end 1098. Flange is threaded on end 1098 to position desired. Display 138 is secured to desired position by backing collar 1114 onto flange 1020 shell until desired snugness is achieved. Cabling 400 is routed through flange 404 penetration.

Referring to FIG. 10.4, details of an arm base 1022 are disclosed. Base 1022 is a semi circle 60 mm in diameter consisting of the following: three layers 1116 of medium density fabric, carbon fiber or similar material with a 20 mm opening 1118. A 6 mm hole 1120 is drilled in top of 1022 with a 5 mm ID, 5 mm long sleeve 1122 epoxied in. Hole 1120 is positioned 10 mm out from rear (in middle) for insertion of a positioning arm pin 1124. Pin 1124 is composed of brass or similar material that will resist bending and remain stiff without being brittle. Pin 1124 is 5 mm in diameter and 70 mm long. A similar bottom hole 1126 is drilled with sleeve 1128 bonded in hole 1126. A triad of 4 mm wide 12 mm long radial slots from hole 1126 in bottom for arms to protrude through and engage arm 1018. These slots are (with degrees from base 0 degrees 1130); a park slot 1132 (5 degrees), a monitor slot 1134 (50 degrees), and a write slot 1136 (110 degrees).

Referring to FIG. 10.5, there is shown discloses the modification to a collar 1140. Preferred collar 1140 is 15 mm in diameter, 8 mm tall, and has a 5 mm ID center hole. Collar should have a 5 mm set screw 1142 or similar device to secure collar 1140 to pin 1124. Collar should be of mild steel or similar material that will allow drilling and bonding. Collar should be drilled in 3 places (7 mm wide and 4 mm deep) to hold arm positions. Positions are a park hole 1144 at 5 degrees, a monitor hole 1146 at 50 degrees, and a write hole 1148 at 110 degrees with the base right 1130 being 0 degrees and screw 1142 positioned at −30 degrees.

FIG. 10.5 additionally discloses a position locking arm 1150. Arm 1150 is constructed of 4 mm brass rod or similar material that will maintain stiffness and allow shaping as shown. Arm 1150 is 15 mm long and 10 mm high after forming. Arm 1150 (×3) is epoxied or brazed into holes 1144, 1146, and 1148 in position as shown to penetrate slots 1132, 1134, 1136 and engage arm 1018. A locking spring 1168 is shown below collar 1140 to hold arm 1150 in position.

Referring to FIG. 10.6 pod 1070 is built up with a 60 mm diameter, 30 mm tall outward (from center) semi-circle 1152. Circle 1152 is extended down 55 mm terminating in a 20 mm radius semi-circle 1154 at bottom. Front is mortised out with a 25 mm opening 1156 to allow insertion of base 1022. Pod 1070 is jigged vertical and plumb. A 7 mm hole 1158 is drilled through circle 1152 top. An aligned hole 1160 is drilled through circle 1154. A 5 mm ID 7 mm long sleeve 1162 of copper or similar material is bonded in hole 1158. A similar sleeve 1164 is bonded in hole 1160. Base 1022 is epoxied into opening 1156. Base 1022 is positioned prior to epoxy curing by inserting pin 1124 through sleeve 1162, through top base sleeve 1122, through arm 1018 sleeve 1096, through bottom base sleeve 1128 and through sleeve 1164. Pin can be removed following curing of epoxy. Back of pod 1070 features a 30×20 mm hole 1166 cut into the area below base 1022 to allow installation of a soft spring 1168 of steel or similar material 20 mm wide and 30 mm long and collar 1140. Foam 1026 is shown contact cemented to the rear corners of pod 1070 for comfort and protection of the operator. Foam is not bonded on the front or center of pod 1070 for clearance reasons.

Referring to FIG. 2.1, hinges 126 afford the required vertical rigidity for device and display support, however, tension and size adjustment were not available. Referring to FIG. 10.7, details for joining pods with hinges 1004 are disclosed. All pods interconnect with hinge 1004. Details of pod 1070 connecting with hinge 1004 and pod 130 are given below, with the understanding that all pod interconnections are similar. Pods 1070 and 130 use core 229 or a structural equivalent molded with a 10 degree outward flare 1024 on base open ends (an open end is one that interfaces to a hinge 1004). Core 229 has a sleeve 1170 5 mm ID with appropriate length of mild steel or a structural equivalent is bonded to each open end prior to laminating. Laminations 226 and 228 or a structural equivalent are wrapped to secure sleeves and reinforce core 229. A hinge slot 1172, 41 mm tall and 8 mm deep is cutout to clearance for hinge 1004 and spring 1006 insertion. Hinge 1004 is constructed of foam core 229 or a structural equivalent approximately 38 mm by 38 mm. A sleeve 1174, 5 mm ID with appropriate length of mild steel or structural equivalent is bonded to both ends of core 229. Laminations 226 and 228 or structural equivalent are similarly wrapped around hinge 1004 core 229. Pods 1070 and 130 are aligned drilled 4 mm to form tunnels 208. Vent holes 124, 4 mm are drilled on inside of pods 1070 and 130 with 1.26 mm×1.26 mm spacing orientated to access tunnels 208. Foam 1026, firm cushion type, or similar is contact cemented to all open corners (top and bottom). Hinge 1004 is saddled by spring 1006, inside slot 1172. Spring 1006 is constructed of spring steel or similar material and is similar to a cloths pin spring. Springs 1006 are static in a normal position. Spring 1006 is positioned to hold the hinge out normal to a torso. A hinge pin 1176, 5 mm of brass or similar equivalent of appropriate length is inserted through sleeve 1170 top, spring 1006 top, sleeve 1174, spring 1006 bottom, and sleeve 1170 bottom. This is repeated at all open ends. Amount of tension in a belt 1002 is effected by the number of springs 1006 installed and the gauge of spring wire. A typical belt will have 3 springs per side and may be varied for wearer's preference.

Referring to FIG. 2.1, plate 123 provided support vertical rigidity and cooling but not adjustability. By modifying plate 123 as follows improved comfort and adjustability are realized. Referring to FIG. 10.8, an improved rear plate 1014 is shaped for improved comfort. Top and bottom compliment a torso as shown by trimming to shape shown. Bottom of plate 1014 features a flare 1024 out of about 10 degrees to provide a clearance for hips. Foam 1026 is bonded in corners and center (top and bottom) to protect and comfort the wearer. Foam 1026 should be perforated when covering any hole 124. A plate pod 1178 is cut out of both ends 80×80 mm of plate 1014. Jig plate 1014 and pod 1178 as shown to be vertical and plumb. Align drilling through top and bottom of plate 1014 and inside end 1180 a 7 mm hole 1182. These holes are repeated ×3 every 1.26 mm. Holes 1182 will serve a dual function as size adjustment and tunnels 208. A sleeve 1184 5 mm ID with appropriate length of mild steel or equivalent is bonded into hole 1182 plate 1014 portion only. A similar sleeve 1186 is bonded into inside end 1180 hole 1182. A 5 mm pin 1016 is inserted through sleeve 1184 top and bottom and sleeve 1186 (both sides). A sleeve 188, 5 mm ID of steel or similar material with appropriate length is bonded to the outside end of pod 1178. All exposed core 229 and sleeves are reinforced by wrapping with laminations 226 and 228. Drill pod 1178 both sides 5 mm vent holes 124 spaced 1.26 mm×1.26 mm to access tunnels 208. Cut slot 1172 following the layup process.

Assembly of Alternative Embodiment

Referring to FIG. 10.5, insert arm 1018 into base 1022 at monitor position slot 1134, normal to pod. Compress spring 1168 and referring to FIG. 10.6 squeeze through access hole 1166 Lacing up. Place collar 1140 through hole 1166 on top of spring 1168 as shown. Insert pin 1124 through top sleeve 1162, base sleeve 1122 base, arm sleeve 1096, base sleeve 1128, collar 1140, spring 1168 and sleeve 1164. Travel for pin 1124 is facilitated by leaving ~10 mm of pin 1124 exposed on both top and bottom ends. To adjust, press pin 1124 from bottom to achieve ~10 mm extension on both ends. With screw 1142 at −30 deg, tighten screw with appropriate tool through hole 1166. Arm 1018 will now be capable of being positioned by pressing top of pin 1124, rotating arm 1018 to desired position, and releasing pin 1124.

In the event of an object colliding with a wearer of this device arm 1018 will "break away" to avoid injury to the wearer or offending object. This is accomplished by the energy from the collision over coming spring 1168 resistance, releasing arm 1150 from slot 1100 and moving arm 1018, dissipating the collision energy.

Referring to FIG. 3, processor 128 or similar can be installed in a similar manner. Referring to FIG. 4, a similar cable routing can be used. Referring to FIG. 5, a similar display configuration can be used, adding a LVDS transmitter to referring to FIG. 3, processor 128, referring to FIG. 4 a LVDS cable substitutes for cable 400, and referring to FIG. 5, an LVDS receiver will allow use of a larger or active matrix panel. Referring to FIG. 6 through FIG. 6.3, peripheral devices can be attached to referring to FIG. 10 belt 1002. Referring to FIG. 7 through FIG. 7.3, keyboards can be attached. Use of a standard headset plugged into referring to FIG. 3.1 speaker 370 and mic 372 jacks will allow voice commands and voice recognition to be used with this design.

Installation of Alternative Embodiment

Referring to FIG. 10, when installing supportive belt 1002 on a torso, the wearer pulls pod 1068 to the appropriate size, referring to FIG. 10.1 hole 1054, and squeezes and releases top and bottom protrusion 1078, engaging 1010.

Preferred Embodiment

The preferred embodiment of the present invention is shown in FIGS. 10–10.8, 11 and 12. The supportive belt of my invention shown in FIGS. 10–10.8 is described above. In addition, FIGS. 11, 12 illustrate the best mode of the invention in the hinged side pods 130 of FIG. 11 and the rear plate 1014 and rear pods 129 of FIG. 12.

FIG. 11 shows side pods 130 and flat hinge 1004 joined for flexible, hinged movement by a U-shaped pin 1176, wherein respective legs of the pin 1176 couple a respective pod 130 on opposite sides of the flat hinge 1004. A radial spring 1006 is mounted on the pin leg inside the pod-hinge joint at slot 1172, with the respective spring ends inserted into respective holes in the pod 130 and the hinge 1004. Tunnels 208 and vents 124 are provided in each of the pods 130 and flat hinges 1004 for facilitating an air flow along the inside surfaces of the pods and hinges shown in FIG. 11 so as to remove heat from the torso area. It may be noted that foam corners 1026 (see FIG. 10.7) have been removed. Also changed is the inward flared pod bottom 1024, and instead the pod top and bottom are tapered outwardly from the pod inside surface with tapered surface 1190 to improve user comfort, aid in airflow through tunnels 208, and reduce heat buildup.

FIG. 12 shows the double C rear plate 1014, and respective back pods 1178 joined by longitudinal hinge pins 1016 extending through selected holes in the rear plate and pods 1178 for horizontally adjusting the belt size. Tunnels 208 and vents 124 are not provided in the center section of the double C rear plate, and instead, indentations 1192 are provided on the center section for spinal shaping and comfort. The foam corners 1026 (see FIG. 10.8) have been removed. Note that tapered surface 1190 is provided on the double C rear plate. In this case, the inside surfaces of the rear plate 1014 shown in FIG. 12 are thickened somewhat with the top and bottom edges having tapered surfaces 1190 extending from the inside surfaces and tapered outwardly therefrom.

The double C rear plate includes a vertically rigid structure which contacts the muscles on each side of the spine for lumber support, and massages and stimulates the muscles, to thereby promote circulation, supply oxygen to the muscles and remove toxins, minimize muscle fatigue and muscle stiffening.

Accordingly, there is provided a self-tensioning horizontally flexible supportive belt which provides lumbar support with a vertically rigid belt structure. Prior supportive belts of leather and nylon/elastic do not provide these features and lose effectiveness with heat or water.

The belt components are constructed of non-conductive materials, i.e., high strength plastics and carbon fibers/kevlar. The hinge pins also may be coated with a non-conductive material or made of non-conductive materials such as boron rod.

For convenience, the following table identifies the reference numbers and the corresponding elements in the specification and drawings.

The foregoing detailed description has been given for clearness of understanding only, and no unnecessary limitations should be understood therefrom, as modifications will be obvious to those skilled in the art.

TABLE OF COMPONENTS

| Number | Name |
|---|---|
| 100 | Belt support system |
| 101 | Inner belt |
| 102 | Outer belt |
| 103 | Lumbar support pad |
| 104 | Junction site, either side pad 103 |
| 105 | Inner band, of belt 101 |
| 106 | Adjustment plate, ABS, front, between band 105 and band 109 |
| 107 | Loops, Inner band, portion of hook and loop fasteners |
| 108 | Hooks, plate 106, portion of hook and loop fasteners |
| 109 | Outer band, of belt 101 |
| 110 | Hooks, inner portion, belt 102 |
| 111 | Loops, outer portion, plate 106 |
| 112 | Loops, out side portion, band 109 |
| 113 | Sleeve, outer, on belt 101 |
| 114 | Seam, sleeve 113 |
| 115 | Loops, sleeve 113 |
| 116 | Anchor band, on band 105 |
| 117 | Hooks, band 116 |
| 118 | Attachment site, seam for band 116 to band 105 |
| 119 | Suspender loops (×4), sewn to seam 114 |
| 120 | Quick release latch, HCD hinge, Hartwell, corp. Placentia, CA |
| 121 | Sleeve termination |
| 122 | Air holes, pad 103 |
| 123 | Rear plate |
| 124 | Vent hole, rear plate 123 |
| 125 | Bumps, foam, pad 103 |
| 126 | Hinge, piano type |
| 127 | Mounting sites, processor |
| 128 | Housing, processor |
| 129 | Back pod (×2) |
| 130 | Side pod (×2) |
| 131 | Front pod (×2) |
| 132 | Hinge, pods |
| 133 | Hooks, inside, belt 102 |
| 134 | Tab, anchor, pods 131 |
| 135 | Loops, tab 134 |
| 136 | Point, attachment, for arm 137 |
| 137 | Arm, articulating, Wind Tech, GN-10, Olens Audio Group, Scottsdale, AZ |
| 138 | Display, housing |

-continued

TABLE OF COMPONENTS

| Number | Name |
|---|---|
| 200 | Foam core, belt 102 |
| 202 | Gap, belt 102 |
| 204 | Cuts, Into core 200, 6 places |
| 206 | Core, tunnels, foam, plate 123 |
| 208 | Tunnels, top |
| 210 | Laminations, front, plate 123 |
| 212 | Laminations, back, plate 123 |
| 214 | Carbon fiber material lamination, medium weight |
| 216 | Arymid fiber material lamination, (Kevlar TM), medium weight |
| 218 | Carbon fiber material lamination, medium weight |
| 220 | Holes, for plate 123 mounting |
| 222 | T-Nuts, for housing 123 mounting |
| 224 | Open leaf, of hinge 126 |
| 226 | Lamination, inside pods 129–131, both sides |
| 228 | Lamination, outside pods 129–131, both sides |
| 229 | Core, pod, closed cell foam |
| 230 | Open leaf, of hinge 132 |
| 232 | Additional core material, pod 131, closed cell foam |
| 234 | Hole, for arm 137 |
| 236 | Point, attachment angle, for arm 137 |
| 238 | Flange, arm 137, Wind Tech 8040 |
| 240 | Tunnel routing, cable 400 |
| 242 | Pad, receptacle, hinge, HCD hinge |
| 244 | Laminations, pod 131, outside |
| 246 | Laminations, pod 131, inside |
| 300 | Case, housing 128, ABS, RF coated |
| 302 | Mounting screws, housing 128 |
| 304 | Cover plate, housing 128, aluminum |
| 305 | Hole, in plate 304 |
| 306 | Heat conduit, aluminum block |
| 308 | Processor, 486 DX/100, any pin compatible 486 processor |
| 310 | Hole (PCMCIA) |
| 312 | Door (PCMCIA) |
| 314 | Card stack (PC104) |
| 316 | Computer card, single board, MSM 486 DX/100, Advanced Logic, San Diego, CA |
| 318 | Sound card, Crystal MM, Diamond Systems, Palo Alto, CA |
| 320 | Adapter card, PCMCIA, IO/P2, Eurotech, AMARO, ITALY |
| 321 | Button, eject, PCMCIA cards |
| 322 | Stand-off, circuit board mounting (×4) |
| 324 | Screws, circuit board mounting (×4) |
| 326 | T-nuts, circuit board mounting (×4) |
| 328 | Ribbon cables, card 316 to panel 330 |
| 330 | I/O Panel, in housing 128 |
| 332 | Separating partition, power supply isolation, with RF coating |
| 334 | Power supply |
| 336 | Cable, power and sense lines |
| 338 | Batteries, "C" size, (×4) |
| 340 | Door, battery 338 |
| 342 | Conductive strap, for batteries in housing 138 |
| 344 | Potentiometer, 100K ohm, sound adjust |
| 346 | On/Off switch |
| 348 | LED, power on indicator |
| 349 | Status line, card 316 |
| 350 | Push button, system reset |
| 351 | Reset line, card 316 |
| 352 | Com 1 connector, male, I/O, bulk head, Micro-D-9 |
| 354 | Com 2 connector, male, I/O, bulk head, Micro-D-9 |
| 356 | LPT 1 connector, female, I/O, bulk head, Micro-D-25 |
| 358 | Key pads connector, female, I/O, bulk head, DIN-5 |
| 360 | VGA connector, female, I/O, bulk head, Micro-D-15 |
| 362 | Display connector, female, I/O, bulk head, Micro-D-25 |
| 364 | Power connector, male, I/O, coaxial power |
| 366 | Mouse connector, female, I/O, bulk head, mini-D-6 |
| 368 | MIDI connector, female, I/O, bulk head, Micro-D-15 |
| 370 | Speaker connector, female, I/O, mini jack stereo |
| 372 | Microphone connector, female, I/O, mini jack, mono |
| 374 | Line connector, female, I/O, mini jack stereo |
| 376 | PCMCIA card, typical |
| 378 | Modem w/voice mail, PCMCIA card |
| 380 | Hard drive, PCMCIA card |
| 382 | RF, PCMCIA card |
| 384 | LAN, PCMCIA card |
| 386 | GPS, PCMCIA card |
| 388 | CD-ROM, PCMCIA card |

-continued

TABLE OF COMPONENTS

| Number | Name |
|---|---|
| 390 | Camera, CCD |
| 392 | Connector, TeleCamera |
| 394 | Cable, TeleCamera |
| 400 | Cable, processor to display, 22 cond. d.s. |
| 402 | Connector, display, cable, I/O, male, bulk head Micro-D-25 |
| 403 | Connector, display, cable, I/O, female, bulk head Micro-D-25 |
| 404 | Flange, display, Windtech 8050 |
| 406 | Cable, Com 1, 8 cond. shielded |
| 408 | Connector, Com 1 cable, I/O, female, bulk head Micro-D-9 |
| 409 | Connector, Com 1, cable, right, male, inline Micro-D-9 |
| 410 | Connector, key pad, I/O, male, bulk head mini-d-6 |
| 412 | Cable, key pad, right, 6 cond. shielded |
| 414 | Connector, Cable, key pad, right, female, inline mini-d-6 |
| 416 | Cable, Com 2, 8 cond. shielded |
| 418 | Connector, Com 2, cable, female, bulk head Micro-D-9 |
| 419 | Connector, Com 2, cable, male, left, inline Micro-D-9 |
| 420 | Cable, key pad, left, 6 pin shielded |
| 422 | Connector, cable, male, left, inline DIN-5 |
| 424 | Cable clip, Heyclip PMCW 37-70 |
| 426 | Connector, mouse, cable, female, I/O, bulk head mini-D-6 |
| 428 | Cable mouse, right, 6 pin shielded |
| 429 | Cable mouse, left, 6 pin shielded |
| 430 | Connector mouse, male, right, inline mini-D-6, |
| 431 | Connector mouse, male, left, inline mini-D-6, |
| 500 | LCD screen, AND10135T-301/-EO, from Purdy El. Burlingame, CA |
| 502 | Back cover, display 138 |
| 504 | Front cover, display 138 |
| 506 | Adapter, display 138 |
| 508 | Connector plate, display 138 |
| 510 | Screws, self tapping, plate 508 (×4) |
| 511 | Holes, plate 508 (×4) |
| 512 | Connector, display 138, bulk head, Micro-D-25 |
| 514 | Small machine screws, connector 512 (×2) |
| 516 | Ribbon cable, LCD 500 - connector 512, 22 cond.1.25 mm pitch |
| 518 | Connector, ribbon cable 516, 22 cond., 1.25 mm pitch, feed through version |
| 520 | LCD header, LCD 500- connector 518 |
| 522 | Holes, LCD 500 mounting, (×4) |
| 523 | Holes, LCD 500, (×4) |
| 524 | Screws, LCD 500 mounting, (×4) |
| 526 | Spacer, LCD 500 mounting, (×4) |
| 528 | T-Nuts, LCD 500 mounting, (×4) |
| 530 | Holes, for speaker 532 in Cover 504, (×5) |
| 532 | Speaker, 8 ohm, any miniature speaker |
| 534 | Wires, speaker 532 |
| 536 | Epoxy drop, securing section 502 to cover 504 |
| 600 | Peripheral device |
| 602 | Strap, mounting, device 600 |
| 604 | Strap center section, strap 602 |
| 606 | Straps, top, strap 602, (×2) |
| 608 | Hooks, attachment, strap 606 |
| 610 | Straps, lower, of strap 602 |
| 612 | Loops, attachment, strap 610 |
| 613 | Hook strap, mounting |
| 614 | "J" hook, commercial "J" hook |
| 616 | Straps, upper, of strap 613 |
| 618 | Hooks, attachment, strap 616 |
| 620 | Attachment pad strap, loops for hooks equipped device |
| 621 | Loop pad |
| 700 | Key pads, Floating Arms TM (FA), Workplace Designs, Stillwater, MN |
| 702 | Hinge body, on Key pads 700, HCD hinge |
| 704 | Cables, F.A. key pads 700 |
| 706 | Cuts, in cables 704 |
| 708 | Connector, male, key pad, cable, right, inline, DIN-5 |
| 709 | Connector, male, cable key pad left, inline, DIN-5 |
| 710 | Connector, mouse, male, inline, mini-D-6 |
| 711 | Cable, F.A., mouse, 6 pin, shielded |
| 712 | Plate, adapter |
| 714 | Core material, plate 712 |
| 716 | Laminations, plate 712 |
| 720 | Plate, F.A. Adapter, supplied with key pads 700 |
| 800 | Personal Digital Assistant (PDA), Sony reg Personal Intelligent Communicator |

-continued

TABLE OF COMPONENTS

| Number | Name |
|---|---|
| 802 | Bracket, foot, slide |
| 804 | Bracket, tongue, slide |
| 806 | Battery pack |
| 808 | Cable, battery 806 |
| 810 | Connector, 12 v mini coax, Sony reg |
| 811 | Receptacle, 12 v mini coax, Sony reg |
| 812 | Telephone, any commercial analog telephone |
| 813 | Connector, male, telephone line |
| 814 | Receptacle, standard telephone line receptacle |
| 815 | Cable, standard telephone line |
| 816 | Earphone, Sony reg MDR-W-10 |
| 817 | Receptacle, earphone 816, mini stereo 3 conductor |
| 818 | Connector, earphone 816, mini stereo 3 conductor |
| 819 | Cable, earphone 816, 3 conductor |
| 820 | Port, Magic, Sony reg 14 pin tongue and groove |
| 822 | Keyboard, Sony reg PICP-K1 |
| 824 | Cable, keyboard 822 |
| 826 | Connector, keyboard 822 |
| 828 | Adapter, keyboard 822 to belt |
| 830 | Slot, PCMCIA card |
| 832 | Cable, PCMCIA card to device |
| 834 | On/Off switch, PDA 800 power |
| 836 | On/Off switch, PDA 800 back light |
| 838 | Adjust knob, PDA 800 back light |
| 840 | Bracket, right angle, 2.54 mm × 2.54 mm × 2.54 mm |
| 900 | Hinge body, on keyboard 822, HCD hinge |
| 1002 | Belt, modified Belt 102 |
| 1004 | Flap, Hinges |
| 1006 | Spring, radial |
| 1008 | Buckle, modified latch 120 |
| 1010 | Pins sliding |
| 1012 | Guides alignment 15 mm high, 12.6 mm long of carbon fiber |
| 1014 | Plate, modified Plate 123 |
| 1016 | Pins, Long |
| 1018 | Arm, modified Arm 137 |
| 1020 | Flange, Display Rotation |
| 1022 | Base, display arm |
| 1024 | Flare, bottom of pod |
| 1026 | Foam, soft cushion with closed cells |
| 1028 | I, Center, Buckle, |
| 1030 | C Left Side, Buckle |
| 1032 | C Right Side, Buckle |
| 1034 | Pin, Buckle left side |
| 1036 | Pin, buckle right side |
| 1038 | Sleeve, 5 mm ID mild steel |
| 1040 | Hole, 6 mm, at top I 1028 |
| 1042 | Sleeve, 5 mm ID mild steel |
| 1044 | Hole, 6 mm in C 1032 |
| 1046 | Sleeve, 5 mm ID steel |
| 1048 | Hole, 6 mm ID in I 1028 |
| 1050 | Epoxy, dab to secure pin 1036 |
| 1052 | Touch pad |
| 1054 | Hole, top of 1030 |
| 1056 | Hole, bottom of 1030 |
| 1058 | Line, verticle center for pod 131 split |
| 1060 | Hole, 6 mm |
| 1062 | Sleeve, 5 mm ID 5.5 OD mild steel |
| 1064 | Line, parallel to 1050, spaced 5 mm both sides |
| 1066 | Pattern, to cut pod 131 |
| 1068 | Pod, split from front of pod 131 |
| 1070 | Pod, split from back of pod 131 |
| 1072 | Rod, brass, 5 mm ID joins 1068 and 1070 |
| 1074 | Epoxy, dab to secure 1072 |
| 1076 | Tab, plastic holds pins 1010 |
| 1078 | Protrusions, extension on 1076 for gripping |
| 1080 | Cavity, mortised out of pod 1060 |
| 1082 | Spring, 25 mm × 5 mm holds pins 1010 closed |
| 1084 | Screw, stop 4 mm diameter 10 mm long |
| 1086 | Nut, 4 mm thread 10 mm wide |
| 1088 | Cover, contains pins 1010 and spring 1082 |
| 1090 | Braid, carbon fiber sleeve A + P L57L75X |
| 1092 | End, base of arm 1018 |
| 1094 | Hole, 6 mm at end 1092 |
| 1096 | Sleeve, copper, 5 mm ID |
| 1098 | End, of arm 1018, tapered to 16 mm, 1.06 threads/mm |

-continued

TABLE OF COMPONENTS

| Number | Name |
|---|---|
|  | (5/8 × 27 tpi) |
| 1100 | Slot, 4 mm × 12.5 mm for position lock |
| 1102 | Rod, left 5 mm brass × 12.5 long |
| 1104 | Rod, right 5 mm brass × 12.5 long |
| 1106 | Hole, 5 mm × 12.5 mm × 20 mm in base of 1018 |
| 1108 | Sleeve, microphone on flange 1020 |
| 1110 | Cut, ridge, on flange 1020 |
| 1112 | Bond, epoxy, attaching 1020 to 506 |
| 1114 | Collar, locking on end 1098 |
| 1116 | Layers, ×3 carbon fiber, medium denisty cured in epoxy |
| 1118 | Opening, 20 mm × 60 mm in base 1022 |
| 1120 | Hole, 6 mm top base 1022 |
| 1122 | Sleeve, 5 mm ID copper top base 1022 hole 1120 |
| 1124 | Pin, 5 mm × 70 mm positioning arm |
| 1126 | Hole, 6 mm bottom base 1022 |
| 1128 | Sleeve, 5 mm ID copper bottom base 1022 hole 1126 |
| 1130 | Base, 0 degrees |
| 1132 | Slot, 4 mm × 12 mm, Park, 5 degree offset in lower base |
| 1134 | Slot, 4 mm × 12 mm, Monitor, 50 degree offset in lower base |
| 1136 | Slot, 4 mm × 12 mm, Write, 110 degree offset in lower base |
| 1140 | Collar, positioning on Pin 1124 |
| 1142 | Screw, Set, in Collar 1140 |
| 1144 | Hole, in Collar for Park position (5 degree offset) 7 mm dia 4 mm deep |
| 1146 | Hole, in Collar for Monitor position (50 degree offset) 7 mm dia 4 mm deep |
| 1148 | Hole, in Collar for Write position (110 degree offset) 7 mm dia 4 mm deep |
| 1150 | Arm, ×3, positioning 4 mm dia 15 mm long 10 mm tall |
| 1152 | Circle, Semi, 60 mm dia build up primary base area |
| 1154 | Circle, Semi, 20 mm rad build up secondary taper out |
| 1156 | Hole, access 25 mm × 60 mm |
| 1158 | Hole, top of 1152 |
| 1160 | Hole, bottom of 1154 |
| 1162 | Sleeve, 5 mm ID in 1158 |
| 1164 | Sleeve, 5 mm ID in 1160 |
| 1166 | Hole, rear access 30 mm × 20 mm |
| 1168 | Spring, soft 20 mm wide 30 mm long |
| 1170 | Sleeve, 5 mm ID mild steel |
| 1172 | Slot, for hinge 41 mm × 8 mm |
| 1174 | Sleeve, 5 mm ID mild steel |
| 1176 | Pin, hinge 5 mm ID brass |
| 1178 | Pod, plate cut out of plate 1014, both sides |
| 1180 | End, inside of pod 1178 |
| 1182 | Hole, 7 mm drilled through plate 1014 and pod 1178 |
| 1184 | Sleeve, 5 mm ID 6 mm OD in plate 1014 |
| 1186 | Sleeve, 5 mm ID 6 mm OD in pod 1178 |
| 1188 | Sleeve, 5 mm ID bonded to outside end of 1178 |
| 308 | Processor, any socket 7 compatable chip |
| 316 | Motherboard, PCM-5862, American Advantek, Sunnyvale, CA |
| 320 | PCMCIA-PC/104 adapter, PCM-3112, American Advantek, Sunnyvale, CA |
| 334 | Power Supply, DC-DC conv. CA24T12-30, Wall Industries, Exeter, NH |
| 338 | Battery, SMP-202PS, Simplo, Freemont, CA |
| 380 | HDD, Toshiba, HDD2712B,(any 2.5" HDD) |
| 500 | LCD, Sharp LQ9D340, Wyle Labs, Austin, TX |
| 1190 | Tapered surface |

What is claimed is:

1. In a belt for supporting devices around a user's torso, including a plurality of respective belt mounting positions for supporting respective devices to the belt around the torso, and a fastener for securely fastening the belt around the torso, the improvement comprising:

a plurality of pod elements at the respective belt mounting positions and coupled to the fastener for location immediately adjacent the torso;

each pod element vertically rigid on said torso for rigidly supporting said devices; and respective hinge members interconnecting said pod elements to each other and to said fastener for providing horizontal flexibility to said belt, such that said belt provides vertical rigidity with horizontal flexibility on said torso.

2. A belt according to claim 1, wherein said hinge members include a connecting flap and hinge pins, said hinge pins hingedly connecting said flap to said pod elements and to said fastener.

3. A belt according to claim 1, wherein said pod elements include elongated passageways through said pod element and extending longitudinally of said torso to enable air to flow upwardly through said pod element and thereby remove heat from said torso adjacent said pod elements.

4. A belt according to claim 1, wherein said pod elements include an interior surface for location immediately adjacent said torso and an opposite exterior surface, and elongated passageways through said pod element between said interior and exterior surfaces and extending longitudinally of said torso to enable air to flow upwardly through said pod element and thereby remove heat from said torso adjacent said pod elements.

5. A belt according to claim 1, including a cantilevered arm having a base end and a support end for supporting one of said devices at said support end, and base support means for mounting said cantilevered arm base end to one of said pod elements.

6. A belt according to claim 1, including a plurality of computer components, and component mounting means for mounting said computer components to respective pod elements on said belt.

7. A belt according to claim 1, including a rear plate mounted between two pod elements, said rear plate defined by a central section, respective outwardly facing C-shaped sections on opposite sides of said central section adjacent respective ones of said two pod elements, and hinge pin means for hingedly connecting each of said C-shaped sections to a respective one of said two pod elements, and further including lumbar support means through tension and lumbar muscle stimulation on each C-shaped section which contacts the muscles on each side of the spine of a user wearing said supportive belt on the torso.

8. A belt according to claim 1, including size adjusting means for adjusting the horizontal size of said belt to a torso.

9. A belt according to claim 2, including a respective spring member associated with a corresponding one of said hinge pins for providing self-tensioning of said belt.

10. A belt according to claim 2, wherein said hinge pins are U-shaped with two legs, each leg engaging said connecting flap and a respective pod element on opposite sides of said connecting flap.

11. A belt according to claim 10, including a respective spring member associated with of corresponding one of said U-shaped hinge pins for providing self-tensioning of said belt.

12. A belt according to claim 11, wherein said spring members comprise a radial spring operatively engaged with a respective leg of said U-shaped hinge pin.

13. A belt according to claim 4, including vent passageways in said pod element extending from said interior surface transversely to intersect said elongated passageway to aid in venting air and removing heat from said torso adjacent said interior surface.

14. A belt according to claim 4, wherein said pod elements include a tapered surface tapering outwardly from said inside surface, said elongated passageways initiating at said tapered surface to facilitate said flow of air into said passageways to aid in the removal of heat from said torso.

15. A belt according to claim 5, wherein said support means includes a base portion for positionably mounting said cantilevered arm base end, including position locking means for enabling the positioning and locking of said base end on said base portion.

16. A belt according to claim 15, wherein said cantilevered arm base end includes a locking slot, and said position locking means includes multiple fingers for selectively engaging said locking slot to enable locking said base end on said base portion.

17. A belt according to claim 16, wherein said base portion includes multiple position slots cooperating with said position locking means multiple fingers to enable positioning of said cantilevered arm base end on said support means base portion.

18. A belt according to claim 5, including a flange mounted to said cantilevered arm support end, including mounting means for said device enabling said device to be tilted, rotated and positionally adjusted in four directions.

19. A belt according to claim 18, including a display device mounted to said cantilevered arm support end by said mounting means.

20. A belt according to claim 18, including one of a display device, audio device, input data device, and output data device mounted to said cantilevered arm support end by said mounting means.

21. A belt according to claim 19, including components, and component mounting means for mounting said computer components to respective pod elements on said belt; and a keyboard and mounting means for mounting said keyboard to a pod element on said belt.

22. A belt according to claim 6, including a keyboard, and keyboard mounting means for mounting said keyboard to a pod element on said belt.

23. A belt according to claim 22, including means for selectively adapting said belt including said display device, plurality of computer components, and said keyboard to be utilized on a work surface.

24. A belt according to claim 7, wherein said hinge pin means also provides for belt size adjustability at a plurality of hinged connections between said C-shaped sections and said pod elements.

25. A belt according to claim 7, wherein said rear plate includes an inside surface adjacent the torso, and a tapered surface tapering outwardly from said inside surface.

* * * * *